US012754021B2

(12) United States Patent
Kato et al.

(10) Patent No.: US 12,754,021 B2
(45) Date of Patent: Oct. 6, 2026

(54) INFORMATION PROCESSING DEVICE, CONTROL METHOD, PROGRAM AND STORAGE MEDIUM

(71) Applicants: PIONEER CORPORATION, Tokyo (JP); PIONEER SMART SENSING INNOVATIONS CORPORATION, Tokyo (JP)

(72) Inventors: Masahiro Kato, Kawagoe (JP); Shin Matsuzaki, Kawasaki (JP); Masahiro x Kato, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 0 days.

(21) Appl. No.: 18/844,498

(22) PCT Filed: Mar. 15, 2022

(86) PCT No.: PCT/JP2022/011590
§ 371 (c)(1),
(2) Date: Sep. 6, 2024

(87) PCT Pub. No.: WO2023/175715
PCT Pub. Date: Sep. 21, 2023

(65) Prior Publication Data
US 2025/0231029 A1 Jul. 17, 2025

(51) Int. Cl.
*G01C 21/20* (2006.01)
*G06T 7/73* (2017.01)
*G06T 11/26* (2026.01)

(52) U.S. Cl.
CPC ................ *G01C 21/20* (2013.01); *G06T 7/73* (2017.01); *G06T 11/26* (2026.01);
(Continued)

(58) Field of Classification Search
CPC ........ G01C 21/20; G01C 21/203; G06T 7/73; G06T 11/206; G06T 2207/10028;
(Continued)

(56) References Cited

U.S. PATENT DOCUMENTS 3,754,247 A * 8/1973 Hansford .............. G01S 13/874 73/178 R
6,538,622 B1 3/2003 Kojima et al.
(Continued)

FOREIGN PATENT DOCUMENTS

CN 103901806 B 1/2017
JP 2000285394 A 10/2000
(Continued)

OTHER PUBLICATIONS

Patent Cooperation Treaty, International Search Report, Application No. PCT/JP2022/011590, dated Apr. 26, 2022, in 4 pages.

*Primary Examiner* — Anne Marie Antonucci
*Assistant Examiner* — Patrick Daniel Mohl
(74) *Attorney, Agent, or Firm* — Procopio, Cory, Hargreaves & Savitch LLP

(57) ABSTRACT

The information processing device includes an acquisition means and a display processing means. The acquisition means acquires measurement data generated by a measurement device provided on a ship. The display processing means performs a process for displaying information relating to a relative positional relationship between the ship and a berthing area on a display device based on the measurement data, the berthing area being an area where the ship should be positioned when the ship is berthed to a berthing place.

13 Claims, 28 Drawing Sheets

(52) U.S. Cl.
CPC ............... *G06T 2207/10028* (2013.01); *G06T 2207/30204* (2013.01); *G06T 2207/30261* (2013.01)

(58) Field of Classification Search
CPC ........... G06T 2207/30204; G06T 2207/30261; G05D 2107/84; G05D 2109/34; G05D 1/2246; G05D 1/661; G01S 17/87; G01S 17/93; G08G 3/02; B63B 2021/003; B63B 49/00
See application file for complete search history.

(56) References Cited

U.S. PATENT DOCUMENTS

| | | | | |
|---|---|---|---|---|
| 7,389,735 | B2 | 6/2008 | Kaji et al. | |
| 8,978,259 | B1 * | 3/2015 | Stephenson, Jr. | G01S 17/88 33/286 |
| 2012/0072059 | A1 | 3/2012 | Glaeser | |
| 2013/0080044 | A1 * | 3/2013 | Tyers | G08G 3/02 440/1 |
| 2013/0297104 | A1 * | 11/2013 | Tyers | B63H 21/21 701/301 |
| 2015/0158564 | A1 * | 6/2015 | Miyamoto | G01C 21/203 340/985 |
| 2019/0308713 | A1 | 10/2019 | Akuzawa et al. | |
| 2021/0070407 | A1 * | 3/2021 | Ishii | B63B 79/10 |
| 2021/0094665 | A1 * | 4/2021 | Schmid | B63B 1/125 |
| 2021/0347449 | A1 | 11/2021 | Dake et al. | |
| 2021/0357655 | A1 * | 11/2021 | Park | G06N 3/04 |
| 2022/0206496 | A1 * | 6/2022 | Tyers | G01C 21/203 |
| 2024/0193904 | A1 * | 6/2024 | Marano | G06V 10/26 |

FOREIGN PATENT DOCUMENTS

| | | | |
|---|---|---|---|
| JP | 2005028891 | A | 2/2005 |
| JP | 2005-180949 | A | 7/2005 |
| JP | 2012-528417 | A | 11/2012 |
| JP | 2020-059403 | A | 4/2020 |
| KR | 1020110113029 | A | 10/2011 |
| KR | 101620369 | B1 | 5/2016 |
| KR | 20180065506 | A | 6/2018 |

* cited by examiner

FIG. 5A

| UPPER SURFACE | | | | SIDE SURFACE | | | | STRAIGHT LINE | DISTANCE | | ANGLE |
|---|---|---|---|---|---|---|---|---|---|---|---|
| VIEWING ANGLE | DETECTION | NUMBER OF NORMALS | VARIANCE | VIEWING ANGLE | DETECTION | NUMBER OF NORMALS | VARIANCE | ABSOLUTE VALUE | AMOUNT OF CHANGE | CHANGE RATE | AMOUNT OF CHANGE |
| 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 |

FIG. 5B

| | |
|---|---|
| NUMBER OF TARGET POINTS | $c_3 = \frac{1}{76-10}x - \frac{10}{76-10}$ 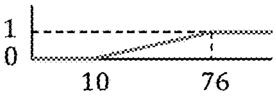  |
| STANDARD DEVIATION OF TARGET POINTS | $c_2 = \frac{1}{0.1-0.2}x - \frac{0.2}{0.1-0.2}$ 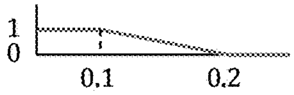  |
| POINT CLOUD BOTH SIDES /ONE SIDE | $c_1 = \begin{cases} 0.0 & (x = 0) \\ 1.0 & (x = 1) \end{cases}$ |
| INTERVAL BETWEEN TWO ENDS OF TARGET POINTS | $c_0 = \frac{1}{20.0-4.0}x - \frac{4.0}{20.0-4.0}$ 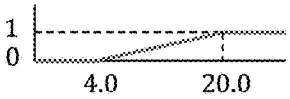  |
| CALCULATION RELIABILITY | $c = \frac{w_3c_3 + w_2c_2 + w_1c_1 + w_0c_0}{w_3 + w_2 + w_1 + w_0}$ $(w_3 = 8.0, w_2 = 4.0, w_1 = 2.0, w_0 = 1.0)$ |
| TOTAL RELIABILITY | $r = \frac{w_{qs}(q_{s0} + q_{s1}) + w_{qu}(q_{u0} + q_{u1}) + w_m(m_0 + m_1) + w_c c}{2w_{qs} + 2w_{qu} + 2w_m + w_c}$ $(w_{qs} = 2.0, w_{qu} = 1.0, w_{m0} = 1.0, w_{m1} = 1.0, w_c = 1.0)$ |

INFORMATION PROCESSING DEVICE, CONTROL METHOD, PROGRAM AND STORAGE MEDIUM

CROSS-REFERENCE TO RELATED APPLICATIONS

This application is the US National Stage of International Patent Application of PCT/JP2022/011590, filed on Mar. 15, 2022 the contents of which are incorporated herein by reference.

TECHNICAL FIELD

The present disclosure relates to processing when a ship is berthed.

BACKGROUND ART

Conventionally, there is known a technology which supports berthing of a ship. For example, Patent Document 1 discloses a technique for controlling to change the attitude of the ship so that the light irradiated from the lidar and then reflected by the object around the berthing position can be received by the lidar, in the automatic berthing device for performing automatic berthing of a ship.

RELATED ART DOCUMENT

Patent Document

Patent Document 1: Japanese Patent Application Laid-Open under No. 2020-59403

SUMMARY OF THE INVENTION

Problem to be Solved by the Invention

For ships, it is important to berth safely and smoothly to a berthing place, and it is particularly desired to realize a berthing support system for ship steering support and automatic operation. Further in order to realize safe and smooth berthing, it is necessary to accurately grasp the positional relationship between the ship and the berthing area where the ship should be located when the ship is berthing, for example.

The present disclosure has been made in order to solve the problems as described above, and its main object is to provide an information processing device capable of accurately grasping the positional relationship between the berthing area and the ship.

Means for Solving the Problem

An invention described in claim is an information processing device comprising: an acquisition means configured to acquire measurement data generated by a measurement device provided on a ship; and a display processing means configured to perform a process for displaying information relating to a relative positional relationship between the ship and a berthing area on a display device based on the measurement data, the berthing area being an area where the ship should be positioned when the ship is berthed to a berthing place.

An invention described in claim is a control method performed by a computer, comprising: acquiring measurement data generated by a measurement device provided on a ship; and performing a process for displaying information relating to a relative positional relationship between the ship and a berthing area on a display device based on the measurement data, the berthing area being an area where the ship should be positioned when the ship is berthed to a berthing place.

An invention described in claim is a program causing a computer to execute processing of: acquiring measurement data generated by a measurement device provided on a ship; and performing a process for displaying information relating to a relative positional relationship between the ship and a berthing area on a display device based on the measurement data, the berthing area being an area where the ship should be positioned when the ship is berthed to a berthing place.

BRIEF DESCRIPTION OF THE DRAWINGS

FIG. 5A shows an example of a data structure of reliability information.

FIG. 5B is a diagram showing an example of the indexes and reliability included in the reliability information.

MODES FOR EXERCISING THE INVENTION

Figure 1A:
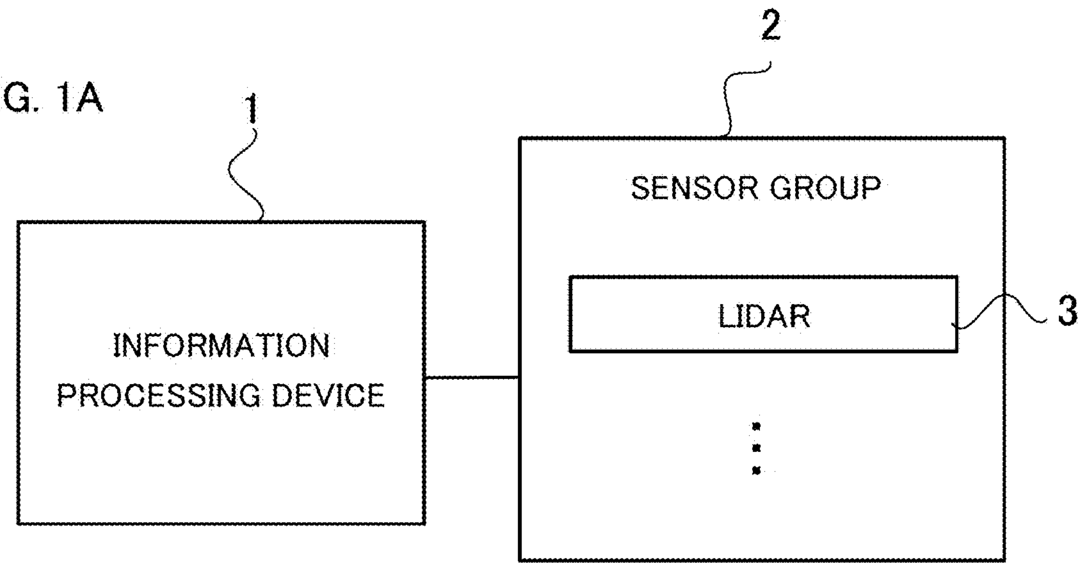
FIG. 1A is a block diagram of an operation support system.

According to one aspect of the present invention, there is provided an information processing device comprising: an acquisition means configured to acquire measurement data generated by a measurement device provided on a ship; and a display processing means configured to perform a process for displaying information relating to a relative positional relationship between the ship and a berthing area on a display device based on the measurement data, the berthing area being an area where the ship should be positioned when the ship is berthed to a berthing place.

The information processing device comprises an acquisition means and a display processing means. The acquisition means acquires measurement data generated by a measurement device provided on a ship. The display processing means performs a process for displaying information relating to a relative positional relationship between the ship and a berthing area on a display device based on the measurement data, the berthing area being an area where the ship should be positioned when the ship is berthed to a berthing place. Thus, it is possible to accurately grasp the positional relationship between the berthing area and the ship.

According to one mode, the above information processing device further comprises a marker position acquisition means configured to acquire a position of at least one marker serving as a mark for the berthing area, based on the measurement data, wherein the display processing means performs the process for displaying information relating to the relative positional relationship between the ship and the berthing area determined based on the at least one marker on the display device.

According to another mode of the above information processing device, the display processing means performs a process for displaying information relating to a distance from a bow of the ship to a front end of the berthing area, and information relating to a distance from a stern of the ship to a rear end of the berthing area on the display device.

According to still another mode of the above information processing device, the display processing means further performs a process for displaying information relating to a distance from the ship to a side surface of a quay of the berthing place.

According to still another mode of the above information processing device, the display processing means performs a process for displaying information relating to speed at which the ship moves in a quay direction of the berthing area and information relating to speed at which the ship moves in a front and rear direction of the berthing area on the display device.

According to still another mode of the above information processing device, the display processing means further performs a process for displaying information relating to movement speed of the ship on the display device, the movement speed being calculated by combining the speed at which the ship moves in the quay direction of the berthing area and the speed at which the ship moves in the front and rear direction of the berthing area.

According to still another mode of the above information processing device, the display processing means performs a process for displaying information relating to an angle indicating a direction of the ship with respect to a side surface of the quay at the berthing place on the display device.

According to still another mode of the above information processing device, the display processing means performs a process for displaying information relating to a predicted position and a predicted attitude of the ship from a present time to a time when a predetermined time has elapsed, on the display device, as information relating to the ship moving in the berthing area.

According to still another mode of the above information processing device, the display processing means performs a process for displaying information relating to a route for guiding the ship from a current position to a predetermined berthing position within the berthing area, on the display device, as information relating to the ship moving within or around the berthing area.

According to still another mode, the information processing device further comprises: a shortest distance calculation means configured to extract a minimum value of lengths of perpendiculars formed from contour points of the ship to a straight line along the side surface of the quay of the berthing place, and calculate a shortest distance from a hull of the ship to the quay of the berthing place; and a proximate portion determination means configured to determine the contour point for which the shortest distance is calculated, to be a proximate portion corresponding to a portion of the hull of the ship closest to the quay of the berthing place, wherein the display processing means performs a process for displaying information relating to the shortest distance and the proximate portion on the display device.

According to still another mode, the information processing device further comprises: an object distance calculation means configured to extract a minimum value of distances from the contour points of the ship to the measurement data representing an object other than the quay of the berthing place, and calculate a shortest distance from a hull of the ship to the object; and a proximate portion determination means configured to determine the contour point for which the shortest distance is calculated, as a proximate portion corresponding to a portion of the hull of the ship closest to the object, wherein the display processing means performs a process for displaying information relating to the shortest distance and the proximate portion on the display device.

According to another aspect of the present invention, there is provided a control method performed by a computer, comprising: acquiring measurement data generated by a measurement device provided on a ship; and performing a process for displaying information relating to a relative positional relationship between the ship and a berthing area on a display device based on the measurement data, the berthing area being an area where the ship should be positioned when the ship is berthed to a berthing place.

According to still another aspect of the present invention, there is provided a program causing a computer to execute processing of: acquiring measurement data generated by a measurement device provided on a ship; and performing a process for displaying information relating to a relative positional relationship between the ship and a berthing area on a display device based on the measurement data, the berthing area being an area where the ship should be positioned when the ship is berthed to a berthing place. By executing the program on a computer, the above-described information processing device can be realized. The program can be stored on a storage medium for use.

Embodiments

Preferred embodiments of the present invention will be described below with reference to the attached drawings.

[Outline of Operation Support System]

Figure 1B:
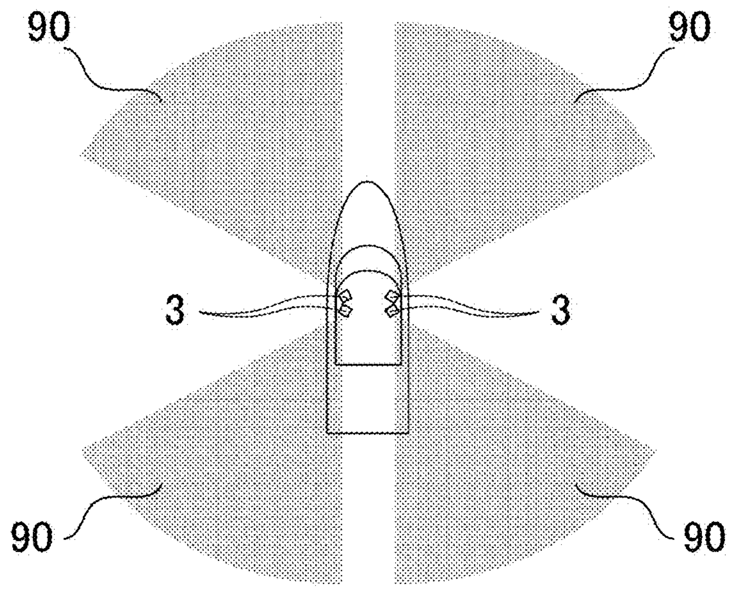
FIG. 1B is a top view showing a ship and field of view ranges of lidars included in the operation support system.
Figure 1C:
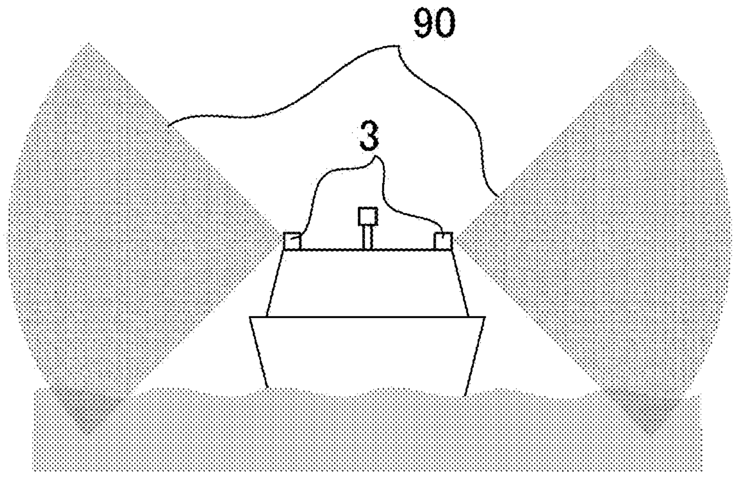
FIG. 1C is a view showing a ship and field of view ranges of lidars from the rear.

FIGS. 1A to 1C show a schematic configuration of an operation support system according to the present embodiment. Specifically, FIG. 1A shows a block configuration diagram of the operation support system, FIG. 1B is a top view illustrating a ship and field of view ranges (also referred to as a "measurement range" or "distance measurable range") 90 of the lidars 3 included in the operation support system described later, and FIG. 1C is a view illustrating the ship and the field of view ranges 90 of the lidars 3 from the rear. The operation support system includes an information processing device 1 which moves together with a ship that is a mobile body, and a sensor group 2 mounted on the ship. Hereafter, the ship equipped with the operation support system is also called a "target ship".

The information processing device 1 is electrically connected to the sensor group 2, and supports the operation of the target ship based on the outputs of various sensors included in the sensor group 2. The operation support includes berthing support such as automatic berthing. Here, "berthing" includes not only the case of docking the target ship to the quay but also the case of docking the target ship to a structural body such as a pier. In the following, the term "berthing place" shall mean a generic term for structures such as a quay, a pier, or the like that are subject to berthing. The information processing device 1 may be a navigation device provided on a ship or an electronic control device built in a ship.

The sensor group 2 includes various external and internal sensors provided on the ship. In the present embodiment, the sensor group 2 includes, for example, a lidar (Lidar: Light Detection and Ranging, or Laser Illuminated Detection And Ranging) 3.

The lidar 3 is an external sensor, which discretely measures the distance to the object existing in the outside by emitting a pulse laser for a predetermined angle range in the horizontal direction (see FIG. 1B) and a predetermined angle range in the vertical direction (see FIG. 1C), and generates a three-dimensional point cloud data indicating the position of the object.

The lidar 3 has an irradiation unit for irradiating a laser beam while changing the irradiation direction, a light receiving unit for receiving the reflected light of the irradiated laser beam (scattered light), and an output unit for outputting a scan data based on the light receiving signal output by the light receiving unit. The data measured for each irradiation direction of the laser beam (scanning position) is generated based on the irradiation direction corresponding to the laser beam received by the light receiving unit and the response delay time of the laser beam identified based on the received light signal described above. Hereafter, the point measured by irradiating the laser beam within the measurement range of the lidar 3 or the measurement data thereof is referred to as a "measured point".

In the example of FIGS. 1B and 1C, as the lidars 3, a lidar directed toward the port front of the target ship, a lidar directed toward the port rear of the target ship, a lidar directed toward the starboard front of the target ship, and a lidar directed toward the starboard rear of the target ship are respectively provided on the ship. When the target ship approaches the berthing place, the point cloud data obtained by measuring the berthing place are generated by the front lidar 3 and the rear lidar 3 provided on the side of the target ship alongside the berthing place. Hereafter, the lidar 3 on the front side for measuring the berthing place is called a "front lidar", and the lidar 3 on the rear side for measuring the berthing place is called a "rear lidar". The front lidar and the rear lidar are examples of a "first measurement device" and a "second measurement device". The arrangement of the lidars 3 is not limited to the example shown in FIGS. 1B and 1C.

Here, the point cloud data can be regarded as an image (frame) representing each measurement direction by a pixel and representing the measurement distance and the reflection intensity value in each measurement direction by pixel values. In this case, the emission direction of the laser beam (i.e. the measurement direction) in the elevation angle is different in the vertical direction of the pixels, and the emission direction of the laser beam in the horizontal angle is different in the horizontal direction of the pixels. Hereafter, the measured points corresponding to the alignment of pixels (i.e., vertical alignment) for which the position of the index in the horizontal direction coincide when the point cloud data is regarded as an image is referred to as a "vertical line". In addition, the index in the horizontal direction when the point cloud data is regarded as an image is called a "horizontal number", and the index in the vertical direction is called a "vertical number".

The lidar 3 is not limited to the above-described scan type lidar. The lidar 3 may be a flash type lidar for generating three-dimensional data by diffusing and irradiating a laser beam to the field of view of the two-dimensional array-shaped sensor. The lidar 3 is an example of a "measurement device" in the present invention.

[Configuration of the Information Processing Device]

Figure 2:
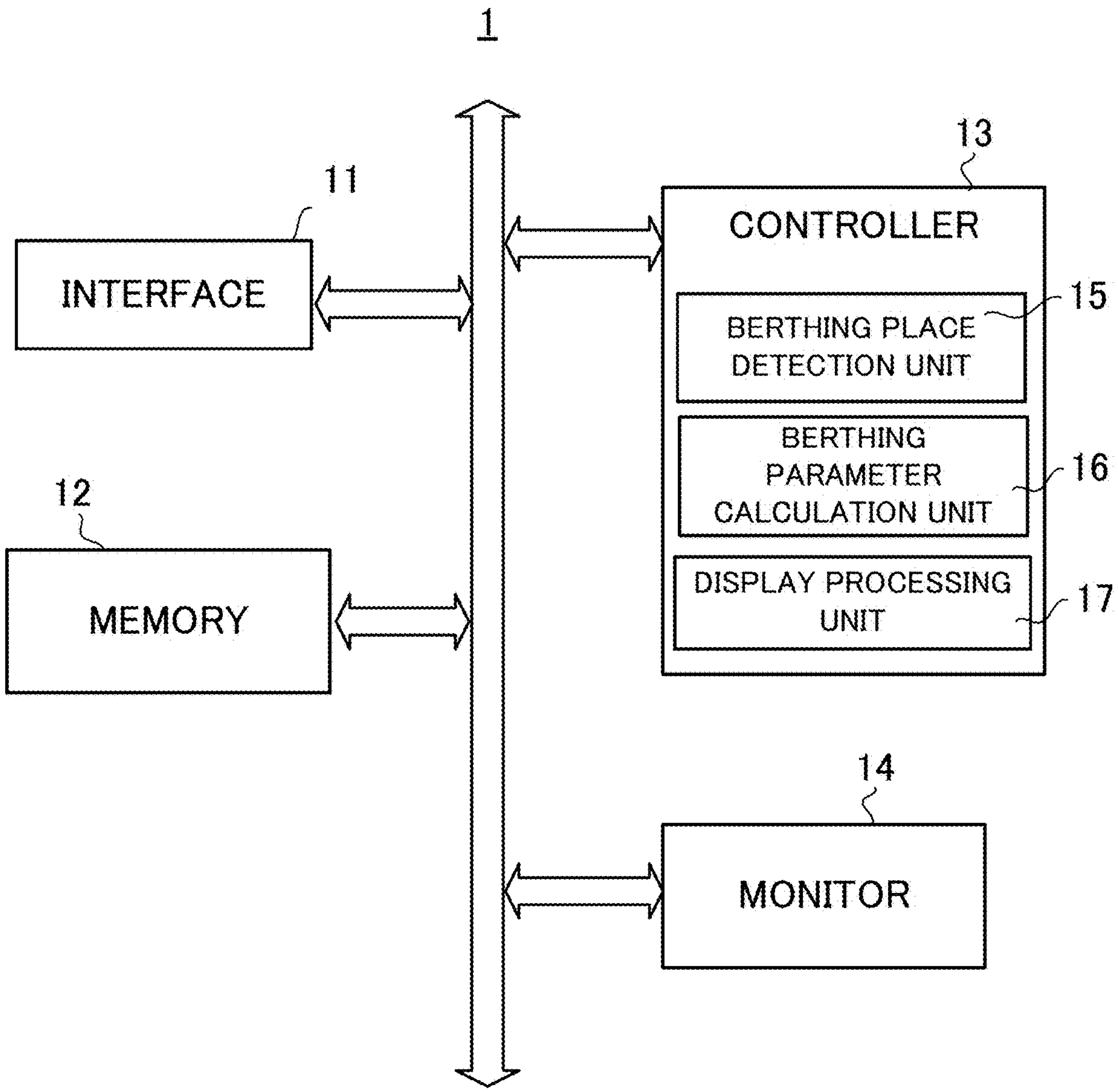
FIG. 2 is a block diagram showing an example of a hardware configuration of an information processing device.

FIG. 2 is a block diagram illustrating an example of a hardware configuration of an information processing device 1. The information processing device 1 mainly includes an interface 11, a memory 12, a controller 13, and a monitor 14. Each of these elements is connected to each other through a bus line.

The interface 11 performs the interface operation related to the transfer of data between the information processing device 1 and the external devices. In the present embodiment, the interface 11 acquires output data from the sensors of the sensor group 2 and supplies them to the controller 13. Further, for example, the interface 11 supplies signals for the control of the target ship generated by the controller 13 to each component of the target ship to control the operation of the target ship. For example, the target ship includes a driving source such as an engine or an electric motor, a screw for generating a propulsive force in the traveling direction based on the driving force of the driving source, a thruster for generating a lateral propulsive force based on the driving force of the driving source, and a rudder or the like which is a mechanism for freely determining the traveling direction of the ship. Then, during automatic operation such as automatic berthing, the interface 11 supplies the control signals generated by the controller 13 to these components. In the case where an electronic control device is provided in the target ship, the interface 11 supplies the control signal generated by the controller 13 to the electronic control device. The interface 11 may be a wireless interface such as a network adapter for performing wireless communication, or a hardware interface for connecting to an external device by a cable or the like. Also, the interface 11 may perform interface operation with various peripheral devices such as an input device, a display device, a sound output device, and the like.

The memory 12 may be constituted by various volatile and non-volatile memories such as a RAM (Random Access Memory), a ROM (Read Only Memory), a hard disk drive, a flash memory, and the like. The memory 12 stores programs for the controller 13 to perform predetermined processes. The programs executed by the controller 13 may be stored in a storage medium other than the memory 12.

In addition, the memory 12 stores information necessary for the processing performed by the information processing device 1 in the present embodiment. For example, the memory 12 may store map data including information about the positions of the berthing places. In another example, the memory 12 stores information about the size of the down-sampling when down-sampling is performed on the point cloud data obtained when the lidar 3 performs scanning for one period.

The controller 13 includes one or more processors such as a CPU (Central Processing Unit), a GPU (Graphics Processing Unit), and a TPU (Tensor Processing Unit), and controls the entire information processing device 1. In this case, the controller 13 performs processing for the operation support or the like of the target ship by executing the programs stored in the memory 12 or the like.

The controller 13 functionally includes a berthing place detection unit 15 and a berthing parameter calculation unit 16, and a display processing unit 17. The berthing place detection unit 15 performs processing for the detection of the berthing place based on the point cloud data output by the lidar 3. The berthing parameter calculation unit 16 calculates parameters (also referred to as "berthing parameters") necessary for berthing to the berthing place. Here, the berthing parameters include a distance between the target ship and the berthing place (a quay distance), an approach angle of the target ship to the berthing place, a speed at which the target ship approaches the berthing place (a berthing speed), etc. Further, the berthing parameter calculation unit 16 calculates information (also referred to as "reliability information") indicating the reliability of the berthing to the berthing place based on the processing result of the berthing place detection unit 15 and the berthing parameters. The display processing unit 17 performs a process for displaying information related to the berthing parameters (also called as "berthing support information") calculated by the berthing parameter calculation unit 16. The controller 13 functions as "an acquisition means", "a marker position acquisition means", "a display processing means", and a computer for executing a program.

The processing performed by the controller 13 is not limited to being implemented in software by a program, but may be implemented by any combination of hardware, firmware, and software. The processing performed by the controller 13 may also be implemented using user programmable integrated circuitry such as, for example, a FPGA (Field-Programmable Gate Array) or a microcomputer. In this case, the integrated circuit may be used to implement a program that the controller 13 executes in this example.

The monitor 14 displays information generated by the controller 13.

[Outline of Berthing Support Processing]

Next, an outline of the berthing support processing executed by the information processing device 1 will be described. The information processing device 1 generates a straight line along the side surface of the berthing place (hereinafter also referred to as "berthing side straight line L") based on the point cloud data of the lidar 3 measured in the direction in which the berthing place is present. In other words, the berthing side straight line L is a straight line along the side surface of the quay at the berthing place. Then, the information processing device 1 calculates the berthing parameters such as the quay distance based on the berthing side straight line L.

Figure 3:
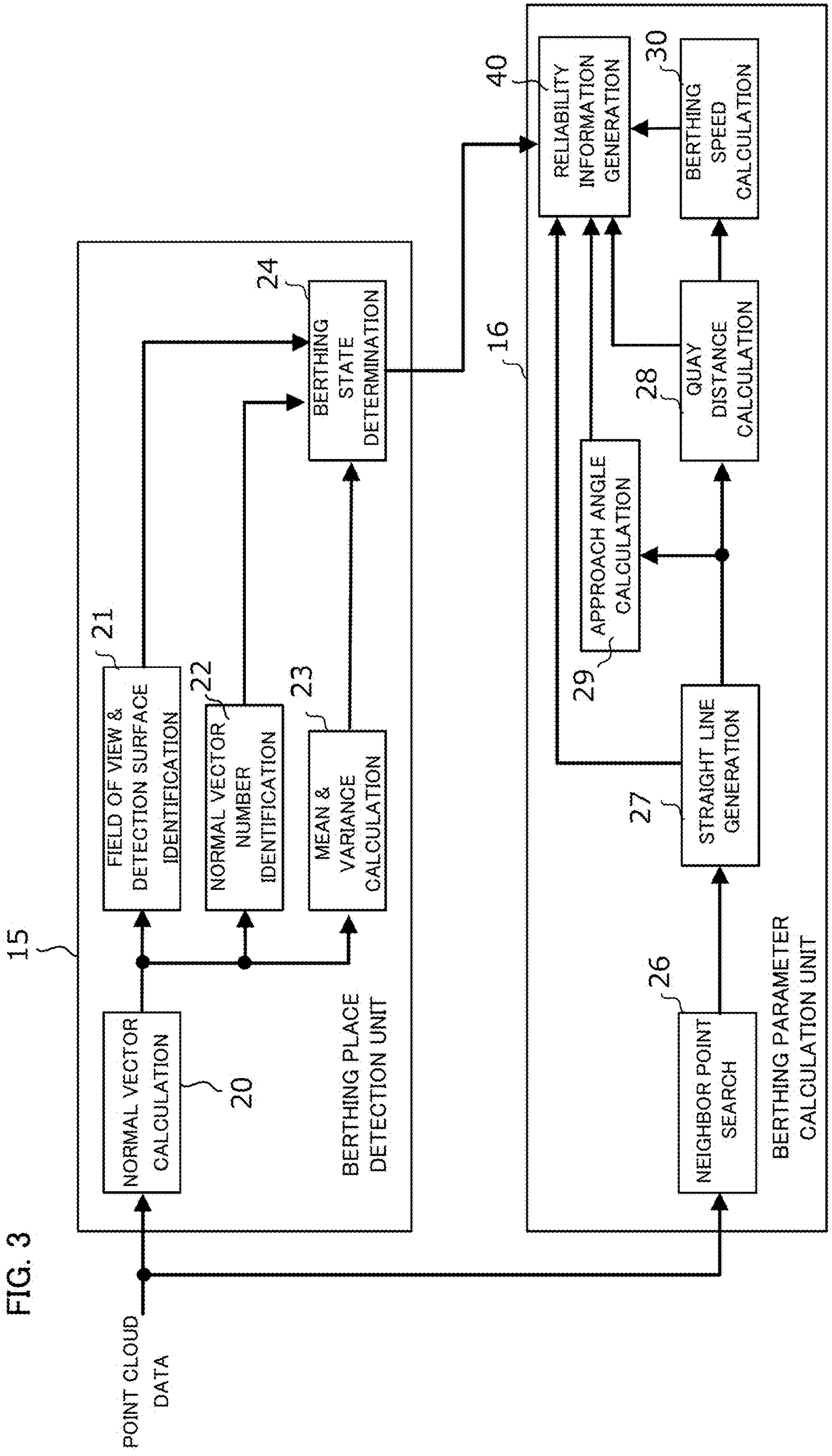
FIG. 3 is a functional block diagram related to berthing support processing.

FIG. 3 is a functional block diagram of the berthing place detection unit 15 and the berthing parameter calculation unit 16 related to the berthing support processing. The berthing place detection unit 15 functionally includes a normal vector calculation block 20, a field of view and detection surface identification block 21, a normal vector number identification block 22, a mean and variance calculation block 23, and a berthing state determination block 24. The berthing parameter calculation unit 16 functionally includes a neighbor point search block 26, a straight line generation block 27, a quay distance calculation block 28, an approach angle calculation block 29, a berthing speed calculation block 30, and a reliability information generation block 40.

The normal vector calculation block 20 calculates normal vectors of a surface (also referred to as a "quay-facing surface") formed by the berthing place based on the point cloud data that the lidar 3 generates in the direction in which the berthing place exists. In this case, the normal vector calculation block 20 calculates the normal vectors described above based on the point cloud data generated by the lidar 3 whose measurement range includes the side of the berthing place of the target ship, for example. The information about the measurement range of the lidar 3 and the direction of the berthing place may be registered in advance in the memory 12, for example.

In this case, the normal vector calculation block 20 preferably performs down-sampling of the point cloud data and removal of the data obtained by the reflection of the laser beam by the water surface (also referred to as "water surface reflection data"), respectively.

In this case, first, the normal vector calculation block 20 removes, from the point cloud data generated by the lidar 3, the data existing below the water surface position as the water surface reflection data (i.e., erroneous detection data). Incidentally, the normal vector calculation block 20 estimates the water surface position based on the mean value in the height direction of the point cloud data generated by the lidar 3 when there is no object other than the water surface in the vicinity, for example. Then, the normal vector calculation block 20 performs down-sampling, which is a process of integrating the measured points into each grid space of a predetermined size, for the point cloud data obtained after removing the water surface reflection data. Then, the normal vector calculation block 20 calculates the normal vectors using a plurality of measured points in the periphery for each measured point indicated by the point cloud data after the down-sampling. Note that the down-sampling may be performed before the removal of the water surface reflection data.

The field of view and detection surface identification block 21 identifies the surface of the berthing place existing within the viewing angle of the lidar 3 (also referred to as "surface within field of view") and the surface of the berthing place detected based on the normal vectors calculated by the normal vector calculation block 20 (also referred to as "detection surface"). In this case, the field of view and detection surface identification block 21 determines whether or not the upper surface or/and the side surface of the berthing place is included as the surface within field of view and the detection surface.

The normal vector number identification block 22 extracts the normal vectors in the vertical direction and the normal vectors in the direction perpendicular thereto (i.e., the horizontal direction) from among the normal vectors calculated by the normal vector calculation block 20, respectively, and calculates the number of the normal vectors in the vertical direction and the number of the normal vectors in the horizontal direction. Here, the normal vector number identification block 22 regards the normal vector in the vertical direction as representing the normal to the measured point on the upper surface of the berthing place and regards the normal vector in the horizontal direction as representing the normal to the measured point on the side surface of the berthing place, and calculates each number of the normal vectors as one index of the reliability regarding the berthing place.

The mean and variance calculation block 23 extracts the normal vectors in the vertical direction and the normal vectors in the direction perpendicular thereto (i.e., the horizontal direction) from among the normal vectors calculated by the normal vector calculation block 20, and calculates the mean and variance of the normal vectors in the vertical direction and the mean and variance of the normal vectors in the horizontal direction.

The berthing state determination block 24 acquires the processing results of the field of view and detection surface identification block 21, the normal vector number identification block 22, and the mean and variance calculation block 23, which are identified or calculated based on the same point cloud data, as the determination results representing the detection state of the berthing place at the time of generating the point cloud data. The berthing state determination block 24 supplies the processing results of the field of view and detection surface identification block 21, the normal vector number identification block 22, and the mean and variance calculation block 23 to the berthing parameter calculation unit 16 as the determination results of the detection state of the berthing place.

Figure 4A:
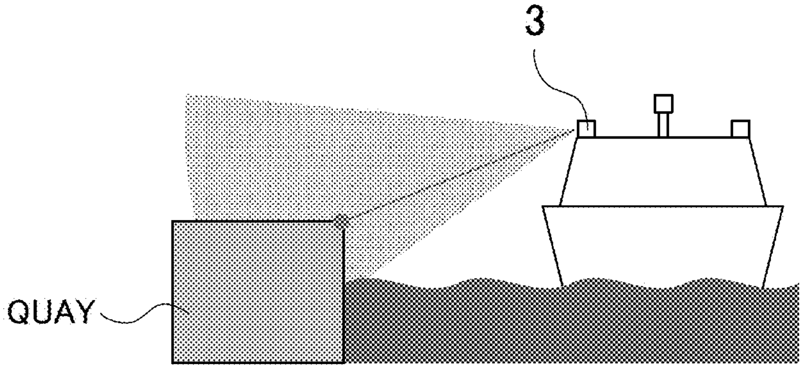
FIG. 4A shows a view in which the lidar is capturing a quay to be berthed.

The neighbor point search block 26 performs a process of searching for the nearest neighbor point closest to the target ship for each vertical line on the basis of the measured points constituting the point cloud data. For example, when the lidar 3 captures a quay to be berthed as shown in FIG. 4A, the nearest neighbor point, which is the closest point to the ship, becomes the edged portion between the upper surface and the side surface of the quay. The set of the points obtained by performing the nearest neighbor search for each vertical line is the gathering of the points near the edge of the quay.

Figure 4B:
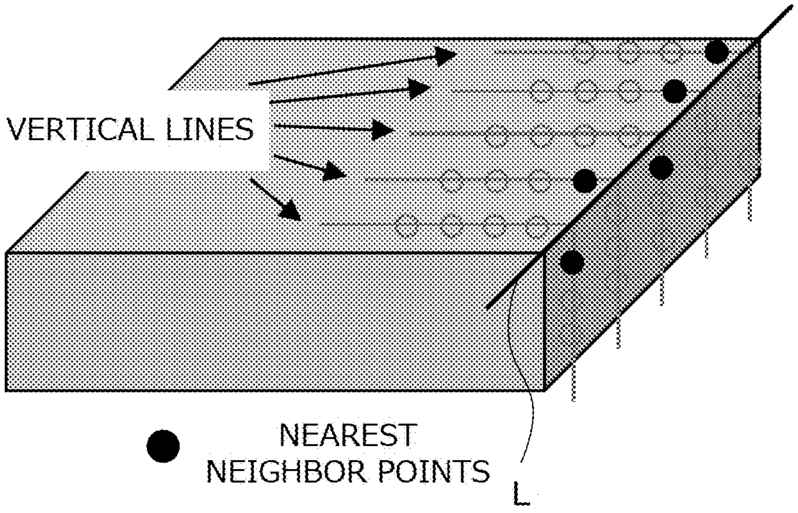
FIG. 4B is a perspective view of the quay showing measured points and a nearest neighbor point for each vertical line on the quay, which is the berthing place measured by the lidar.

The straight line generation block 27 generates the berthing side straight line L, which is a straight line along the side surface of the berthing place, based on the nearest neighbor points determined by the neighbor point search block 26. According to such a process, the straight line generation block 27 can generate a berthing side straight line L shown in FIG. 4B. FIG. 4B is a perspective view of the quay showing the berthing side straight line L.

The quay distance calculation block 28 calculates the quay distance corresponding to the shortest distance between the target ship and the berthing place based on the berthing side straight line L generated by the straight line generation block 27. Here, when there are a plurality of lidars 3 capable of measuring the berthing place, the quay distance calculation block 28 collects the point cloud data of the plurality of lidars 3 to generate the berthing side straight line L, and calculates the shortest distance with each lidar 3 as the quay distance. Alternatively, the quay distance calculation block 28 may generate the berthing side straight line L for each point cloud data of the lidar 3, and calculate the shortest distance between each berthing side straight line L and each lidar 3 as the quay distance. The quay distance calculation block 28 may calculate the shortest distance from a reference point such as the center position of the ship to the berthing side straight line L as the quay distance. Incidentally, instead of regarding the shortest distance for each lidar 3 as the quay distance, the quay distance calculation block 28 may determine the shortest one of shortest distances for the lidars 3 as the quay distance, and may determine the mean of these shortest distances as the quay distance.

The approach angle calculation block 29 calculates the approach angle of the target ship with respect to the berthing place based on the berthing side straight line L generated by the straight line generation block 27. Specifically, the approach angle calculation block 29 calculates the approach angle using "a tan 2" which is a function to obtain the arctangent from two arguments defining the tangent. More specifically, the approach angle calculation block 29 calculates the approach angle by calculating the function a tan 2 from the directional vector of the berthing side straight line L.

The berthing speed calculation block 30 calculates the berthing speed at which the target ship approaches the berthing place, based on the quay distance calculated by the quay distance calculation block 28. For example, the berthing speed calculation block 30 calculates the time change of the quay distance (the shortest distance) as the berthing speed.

The reliability information generation block 40 generates the reliability information on the basis of the processing results of the berthing state determination block 24, the straight line generation block 27, the quay distance calculation block 28, and the approach angle calculation block 29.

Here, a description will be given of a first specific example of generating the reliability information. The reliability information generation block 40 generates a flag for each element such as the viewing angle at the time of detection of the berthing place, the surface detection of the berthing place, the number and variance of the normal vectors, and generates a vector of the generated flags as the reliability information. Hereafter, it is assumed that the reliability of the corresponding element is high when the flag is "1" and the reliability of the corresponding element is low when the flag is "0".

FIG. 5A is a diagram illustrating an example of the data structure of the reliability information generated by the reliability information generation block 40. As shown in FIG. 5A, the reliability information has items of "top surface", "side surface", "straight line", "distance", and "angle". In addition, the item "top surface" has sub-items "viewing angle", "detection", "number of normals", and "variance". The item "side surface" has sub-items "viewing angle", "detection", "number of normals", and "variance". The item "straight line" has a sub-item "absolute value". The item "distance" has a sub-item "amount of change" and "change rate", and the item "angle" has a sub-item "amount of change".

Here, the reliability information generation block 40 registers, in the sub-item "viewing angle" of the item "upper surface", a flag "1" when the upper surface of the berthing place is within the range of the viewing angle and a flag "0" when the upper surface is out of the viewing angle. The reliability information generation block 40 registers, in the sub item "detection" of the item "upper surface", a flag "1" when the upper surface of the berthing place is the detection surface and a flag "0" when the upper surface is not the detection surface. Further, the reliability information generation block 40 registers, in the sub-item "number of normals" of the item "upper surface", a flag "1" when the number of normal vectors with respect to the upper surface of the berthing place is equal to or larger than a predetermined threshold value (for example, 10) and a flag "0" when the number of normal vectors is smaller than the threshold value. Further, the reliability information generation block 40 registers, in the sub-item "variance" of the item "upper surface", a flag "1" when the variance of x,y,z component of the normal vector with respect to the upper surface of the berthing place is smaller than a predetermined threshold value (for example, 1.0) and a flag "0" when any of the variances is equal to or larger than the threshold value. Further, the reliability information generation block 40 registers, in each sub-item of the item "side surface", the flags defined by the same rules as the sub-items of the item "upper surface".

In addition, the reliability information generation block 40 registers, in the sub item "absolute value" of the item "straight line", a flag representing the reliability of the berthing side straight line L generated by the generation method described later. For example, when the lidars 3 are respectively provided at front and rear portion of the target ship, the reliability information generation block 40 registers a flag "1" when all the component-by-component differences between the direction vector of the berthing side straight line L generated by the generation method described later and the direction vector of the straight line connecting the nearest neighbor points of the front and rear lidars 3 on the target ship are smaller than the threshold value, and a flag "0" when any one of the differences is equal to or larger than the threshold value.

Further, the reliability information generation block 40 registers, in the sub-item "amount of change" of the item "distance", a flag "1" when the amount of change of the quay distance calculated by the quay distance calculation block 28 from one time point before is smaller than a predetermined threshold value (e.g., 1.0 m) and a flag "0" when the amount of change is equal to or larger than the threshold value. Further, the reliability information generation block 40 registers, in the sub-item "change rate" of the item "distance", a flag "1" when the change rate of the quay distance calculated by the quay distance calculation block 28 from one time point before is smaller than a predetermined threshold value (for example, 10%) and a flag "0" when the change rate is equal to or larger than the threshold value. The reliability information generation block 40 registers, in the sub item "amount of change" of the item "angle", a flag "1" when the amount of change of the approach angle calculated by the approach angle calculation block 29 from one time point before is smaller than a predetermined threshold value (for example, 1.0 degrees) and a flag "0" when the amount of change is equal to or larger than the threshold value.

Incidentally, each of the threshold values described above is set to a suitable value previously stored in the memory 12 or the like, for example. Further, the reliability information may be generated for each lidar 3.

Figure 5C:
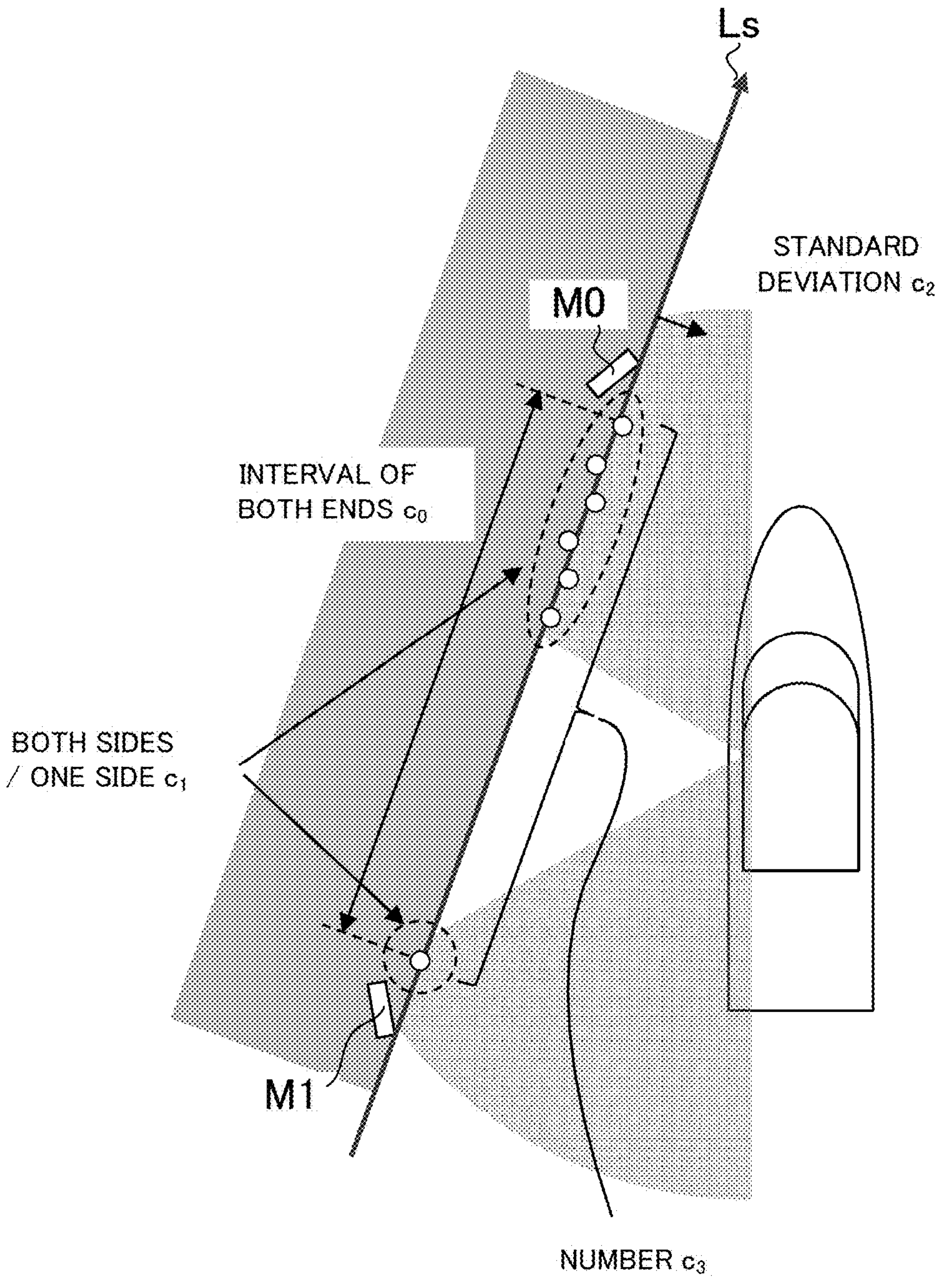
FIG. 5C is a bird's-eye view showing a target ship and the berthing place, with the indexes shown in FIG. 5B.

Next, a second specific example of the generation of the reliability information will be described. FIG. 5B shows an example of indexes and reliability included in the reliability information. FIG. 5C is a bird's-eye view of the target ship and the berthing place, on which the indexes shown in FIG. 5B are specified. Here, the quay which is the berthing place is provided with markers M0 and M1 which are reference objects of berthing. The information processing device 1 detects the markers M0 and M1 on the basis of the point cloud data of the lidar 3, and executes various processes such as the generation of the berthing side straight line L using the measured points (the set of the neighbor points) near the edge of the berthing place existing between the markers M0 and M1. Hereafter, the measured points near the edge of the berthing place that exist between the markers M0 and M1 are also referred to as "target points". Incidentally, when the markers M0 and M1 are not detected, it is assumed that all the set of the neighbor points is regarded as the target points, for example.

The index "$c_3$" is an index based on the number of the target points. Here, as an example, the index $c_3$ is represented by a linear function using the number of the target points as the variable x. The index "$c_2$" is an index based on the standard deviation of the target points. Here, as an example, the index $c_2$ is represented by a linear function using the standard deviation of the target points as the variable x. The index "$c_1$" is an index indicating whether or not two lidars 3 were able to measure both the front side and the rear side of the quay. Here, as an example, the index $c_1$ is set to "1.0" when both sides of the quay were measured, and is set to "0.0" when only one side was measured. The index "$c_0$" is an index based on the interval between the two ends of the target points (both ends along the berthing side straight line L), and is represented by a linear function using the above-described interval between the two ends as the variable x. The indexes $c_0$ to $c_3$ are calculated to be limited in a range from 0 to 1.

The calculation reliability "c" is reliability based on the indexes $c_0$ to $c_3$ described above. Here, the calculation reliability c is a weighted mean of the indexes $c_0$ to $c_3$ using the weighting factors "$w_0$" to "$w_3$" according to the importance with respect to the indexes $c_0$ to $c_3$. Further, an exemplary setting of the weighting factors $w_0$ to $w_3$ is shown. Since each index $c_0$ to $c_3$ is in the range from 0 to 1, the calculation reliability c, which is the weighted mean of them, is also calculated as a numerical value in the range from 0 to 1.

A total reliability "r" is reliability based on a side surface detection reliability "$q_s$" which is a reliability regarding detection of the side surface of the quay, a top detection reliability "$q_u$" which is a reliability regarding detection of the top surface of the quay, a marker detection reliability "$m_0$" regarding the detection of the marker M0, a marker detection reliability "$m_1$" regarding the detection of the marker M1, and the calculation reliability c. Here, the total reliability r is a weighted mean of the reliability $q_s$, $q_u$, $m_0$, $m_1$, c using the weighting factors "$w_{qs}$", "$w_{qu}$", "$w_{m0}$", "$w_{m1}$", "$w_c$" according to the importance with respect to the reliability $q_s$, $q_u$, $m_0$, $m_1$, c. Further, an exemplary setting of the weighting factors $w_{qs}$, $w_{qu}$, $w_{m0}$, $w_{m1}$, $w_c$ is shown. For example, the information processing device 1 may calculate the side surface detection reliability $q_s$ based on the item "side surface" of the reliability information shown in FIG. 5A, and calculate the top surface detection reliability $q_u$ based on the item "top surface" of the reliability information in FIG. 5A. Further, the information processing device 1 may calculate the marker detection reliability $m_0$ and $m_1$ based on the number of the measured points of the markers M0 and M1 in the point cloud data measured by each lidar 3, for example. The side surface detection reliability $q_s$, the top surface detection reliability $q_u$, the marker detection reliability $m_0$, and the marker detection reliability $m_1$ are calculated to be in the range from 0 to 1. In addition, when both the front part and the rear part of the quay are detected, the side surface detection reliability $q_{s0}$ of the front quay, the side surface detection reliability $q_{s1}$ of the rear quay, the top surface detection reliability quo of the front quay, and the top surface detection reliability qui of the rear quay are calculated. Since the side surface detection reliability $q_s$, the top surface detection reliability $q_u$, the marker detection reliability $m_0$, the marker detection reliability $m_1$, and the calculation reliability c are in the range from 0 to 1, the total reliability r, which is the weighted mean of them, is also calculated as a numerical value in the range from 0 to 1. Therefore, it can be seen that the closer the total reliability r is to 1, the higher the reliability of the calculated berthing parameters, and the closer the total reliability r is to 0, the lower the reliability of the calculated berthing parameters.

That is, the reliability information generated by the second specific example includes the indexes and reliability calculated by the above-described method.

Next, a specific example of the processing by the normal vector calculation block 20, the normal vector number identification block 22, and the mean and variance calculation block 23 will be described with reference to FIGS. 6A and 6B.

Figure 6A:
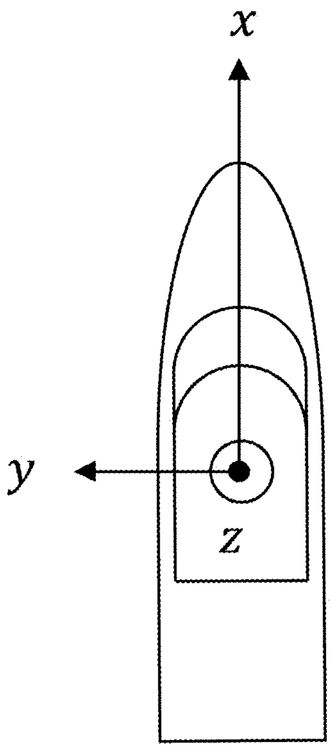
FIG. 6A is a diagram showing an example of a ship coordinate system based on a hull of the target ship.

FIG. 6A is a diagram showing an example of a ship coordinate system based on the hull of the target ship. As shown in FIG. 6A, here, the front (forward) direction of the target ship is defined as "x" coordinate, the side direction of the target ship is defined as "y" coordinate, and the height direction of the target ship is defined as "z" coordinate. The measurement data of the coordinate system based on the lidar 3, which is measured by the lidar 3, is transformed into the ship coordinate system shown in FIG. 6A. Incidentally, the processing of converting the point cloud data of the lidar-based coordinate system installed in the mobile body to the coordinate system of the mobile body is disclosed in the International Publication WO2019/188745, for example.

Figure 6B:
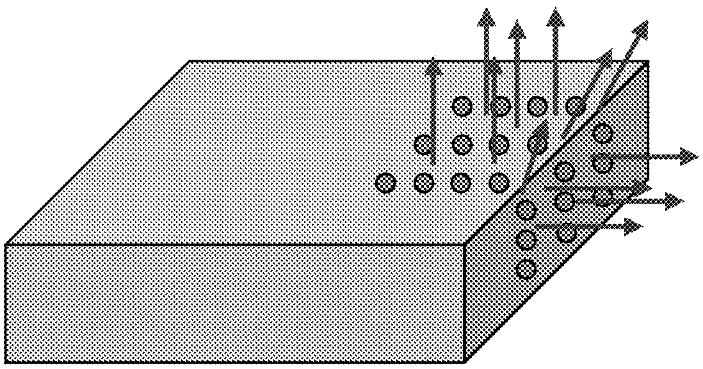
FIG. 6B is a perspective view of a structure showing normal vectors.

FIG. 6B is a perspective view of a berthing place (quay in this case) showing the measured points representing the measured position measured by the lidar 3 and the normal vectors calculated based on the measured points with respect to the quay. In FIG. 6B, the measured points are shown by dots, and the normal vectors are shown by arrows. FIG. 6B shows an example in which both the upper surface and the side surface of the quay could be measured by the lidar 3.

As shown in FIG. 6B, the normal vector calculation block 20 calculates the normal vectors for the measured points on the side surface and the upper surface of the quay. Since the normal vector is a vector perpendicular to the plane or curved surface of interest, the normal vector is calculated using a plurality of measured points that forms a plane. Therefore, the normal vector calculation block 20 sets a grid having a predetermined length in the vertical and horizontal directions or a circle having a radius of a predetermined length, and calculates the normal vector using the measured points existing therein. In this case, the normal vector calculation block 20 may calculate the normal vector for each measured point, or may calculate the normal vector for each predetermined interval. Then, the normal vector number identification block 22 determines the normal vector whose z component is larger than a predetermined threshold value as the normal vector oriented in the vertical direction. It is assumed that the normal vector is vectorized to be a unit vector. Further, the normal vector number identification block 22 determines the normal vector whose z component is smaller than the predetermined threshold value as the normal vector oriented in the horizontal direction. Then, the normal vector number identification block 22 identifies the number of normal vectors in the vertical direction (five in this case) and the number of the normal vectors in the horizontal direction (four in this case). Further, the mean and variance calculation block 23 calculates the mean and variance of the normal vectors in the vertical direction and the mean and variance of the normal vectors in the horizontal direction. It is noted that the normal vectors become oblique at the edge portion because the measured points around the edge portion exist on the upper and side surfaces.

[Details of a Display Method of Berthing Support Information]

Next, a display method of the berthing support information will be described.

(1st Display Method)

Figure 7:
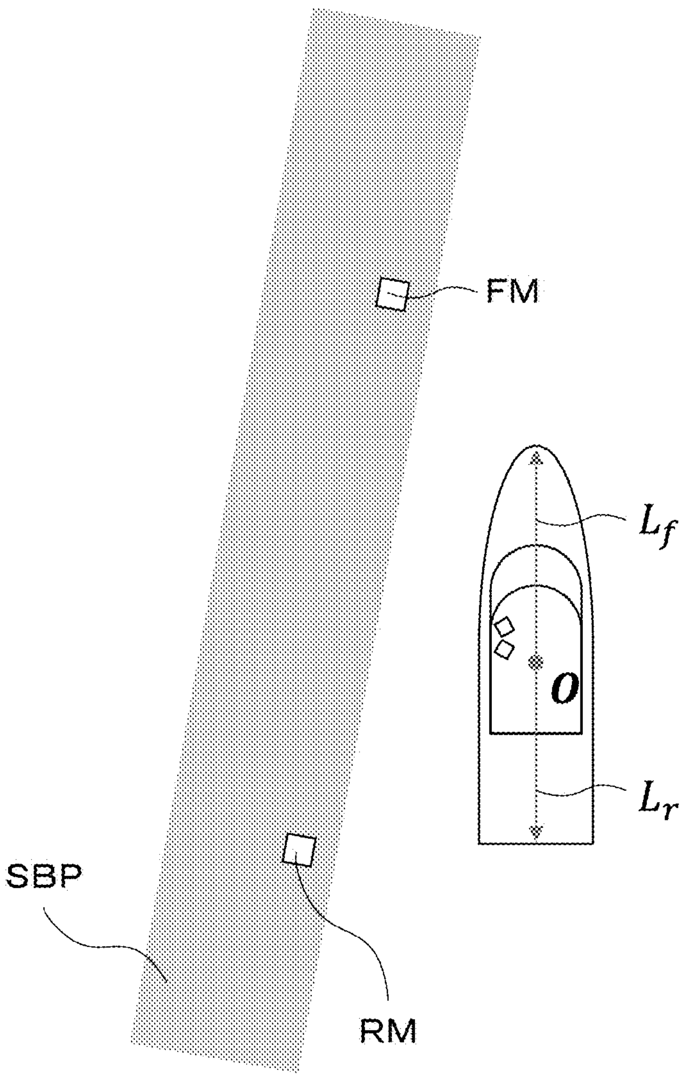
FIG. 7 is a diagram illustrating an example of a berthing place where a front marker and a rear marker are provided.

FIG. 7 is a diagram illustrating an example of a berthing place in which a front marker and a rear marker are provided.

In the present displaying method, for example, description will be given of a case where a ship is berthed to a berthing place SBP to which two markers having high reflectance properties such as a retroreflective plate are provided as shown in FIG. 7. Further, in the explanation after the present display method, unless otherwise mentioned, the marker provided on the front side of the ship to be berthed to the berthing place SPB is referred to as a front marker FM, and the marker provided on the rear side of the ship is referred to as a rear marker RM. Further, in the present display method, the description will be given of the case where the distance Lf from the origin O corresponding to the reference point of the target ship to the bow of the target ship and the distance $L_r$ from the origin O to the stern of the target ship are known. The origin O may be set to the center position or the center of gravity position of the target ship, for example.

Figure 8A:
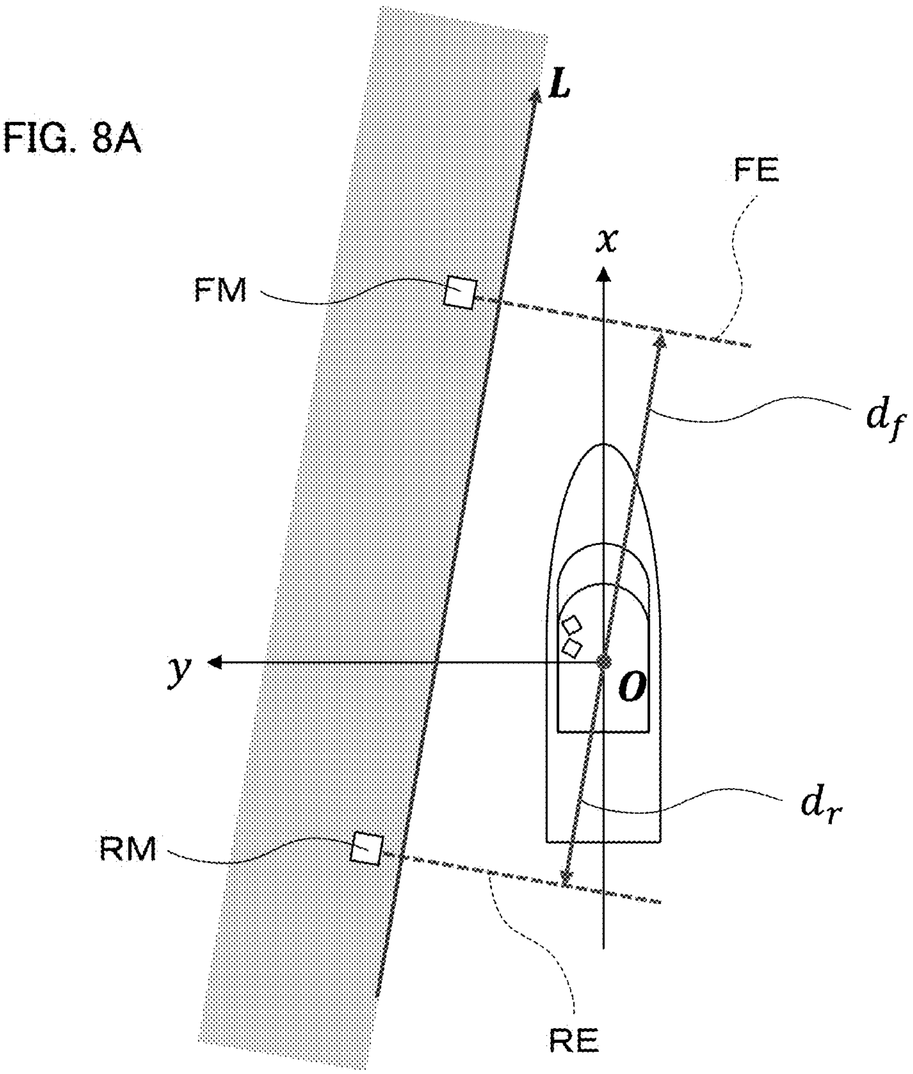
FIG. 8A is a top view showing an origin O, a distance $d_f$ and a distance $d_r$, a front end FE and a rear end RE.

The controller 13 acquires a point cloud data FMG constituting the front marker FM and a point cloud data RMG constituting the rear marker RM, respectively, by performing a process of extracting the measured points having the intensity equal to or higher than a predetermined intensity from the point cloud data generated by the lidar 3. The controller 13 acquires the coordinate position $M_f[m_{fx}\ m_{fy}\ m_{fz}]^T$ of the front marker FM in the ship coordinate system based on the center of gravity of the measured points included in the point cloud data FMG. Also, the controller 13 acquires the coordinate position $M_r[m_{rx}\ m_{ry}\ m_{rz}]^T$ of the rear marker RM in the ship coordinate system based on the center of gravity of the measured points included in the point cloud data RMG. The controller 13 identifies a rectangular area between the front end FE and the rear end RE (see FIG. 8A) as the berthing area based on the coordinate positions $M_f$ and $M_r$. The controller 13 calculates the distance $d_f$ from the origin O of the ship coordinate system to the front end of the berthing area and the distance $d_r$ from the origin O to the rear end of the berthing area based on the coordinate positions $M_f$ and $M_r$ and the berthing side straight line L. The berthing area is the area where the target ship should be located when the target ship is berthed to the berthing place. FIG. 8A is a top view showing the origin O, the distance $d_f$, distance $d_r$, the front end FE and the rear end RE.

Figure 8B:
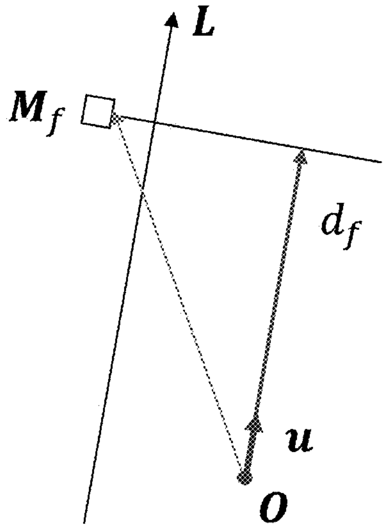
FIG. 8B is a diagram showing a unit vector "u" used to calculate the distance $d_f$ and the distance $d_r$.

Here, a specific example of the process for calculating the distance $d_f$ and the distance $d_r$ will be described with reference to FIGS. 8A and 8B. FIG. 8B is a diagram showing the unit vector "u" used to calculate the distance $d_f$ and the distance $d_r$.

The controller 13 generates the berthing side straight line L given by the following Formula (1).

[Formula 1]

$$L:\begin{bmatrix}L_x\\L_y\\L_z\end{bmatrix}=\begin{bmatrix}x_0\\y_0\\z_0\end{bmatrix}+t\begin{bmatrix}a\\b\\c\end{bmatrix}\tag{1}$$

Here, "$[x_0\ y_0\ z_0]^T$" indicates the center of gravity of the measured points indicated by the edge point cloud of the berthing place, "$[a\ b\ c]^T$" indicates the direction vector, and "t" indicates the mediator. For example, when the principal component analysis is performed, the eigenvector corresponding to the largest eigenvalue is the direction vector of the berthing side straight line L.

Then, the controller 13 calculates the unit vector u to be perpendicular with respect to the berthing side straight line L in two-dimensional plane, by the following Formula (2). The unit vector u is expressed as a vector starting from the origin O, as shown in FIG. 8B.

[Formula 2]

$$u=\frac{1}{\sqrt{a^2+b^2}}\begin{bmatrix}a\\b\end{bmatrix}=\begin{bmatrix}u_x\\u_y\end{bmatrix}\tag{2}$$

The dot product of the (x,y) component of the coordinate position $M_f$ and the unit vector u corresponds to the projection of the coordinate position $M_f$ to the vector u. Therefore, the following Formula (3) regarding the distance "$d_f$" shown in FIG. 8B holds.

[Formula 3]

$$M_f\cdot u=|M_f||u|\cos\theta=|M_f|\cos\theta=d_f\tag{3}$$

Therefore, the controller 13 calculates the distance $d_f$ based on the following Formula (4).

[Formula 4]

$$d_f=m_{fx}u_x+m_{fy}u_y\tag{4}$$

Further, by using the same method as described above, the controller 13 calculates the distance $d_r$ by the following Formula (5). By Formulas (4) and (5), when the origin O is positioned between FE and RE as shown in FIG. 8A, both the distance $d_f$ and the distance $d_r$ are positive values. Also, by Formulas (4) and (5), when the origin O is positioned ahead of FE, the distance $d_f$ is a negative value and the distance $d_r$ is a positive value. Also, by Formulas (4) and (5), when the origin O is positioned behind RE, the distance $d_f$ is a positive value and the distance $d_r$ is a negative value.

[Formula 5]

$$d_f=-(m_{rx}u_x+m_{ry}u_y)\tag{5}$$

Based on the direction vector of the berthing side straight line L, the controller 13 calculates an angle $\Psi_q$ indicating the inclination of the berthing side straight line L when the x-axis direction of the ship coordinate system is used as a reference. In other words, the angle $\Psi_q$ corresponds to the angle indicating the direction of the target ship with respect to the side surface of the quay at the berthing place. The controller 13 calculates the distance $s_f$ from the bow of the target ship to the front end FE of the berthing area by applying the distances $d_f$ and Lf and the angle $\Psi_q$ to the following Formula (6). The controller 13 calculates the distance $s_r$ from the stern of the target ship to the rear end RE of the berthing area by applying the distances $d_r$ and $L_r$ and the angle $\Psi_q$ to the following Formula (7). Further, the controller 13 generates a perpendicular in xy plane from the origin O to the berthing side straight line L, and calculates the distance $d_q$ which is the length of the perpendicular. The distance $d_q$ corresponds to the distance from the target ship to the side surface of the quay.

[Formula 6]

$$s_f=d_f-L_f\cos\psi_q\tag{6}$$

[Formula 7]

$$s_r=d_r-L_r\cos\psi_q\tag{7}$$

Figure 9:
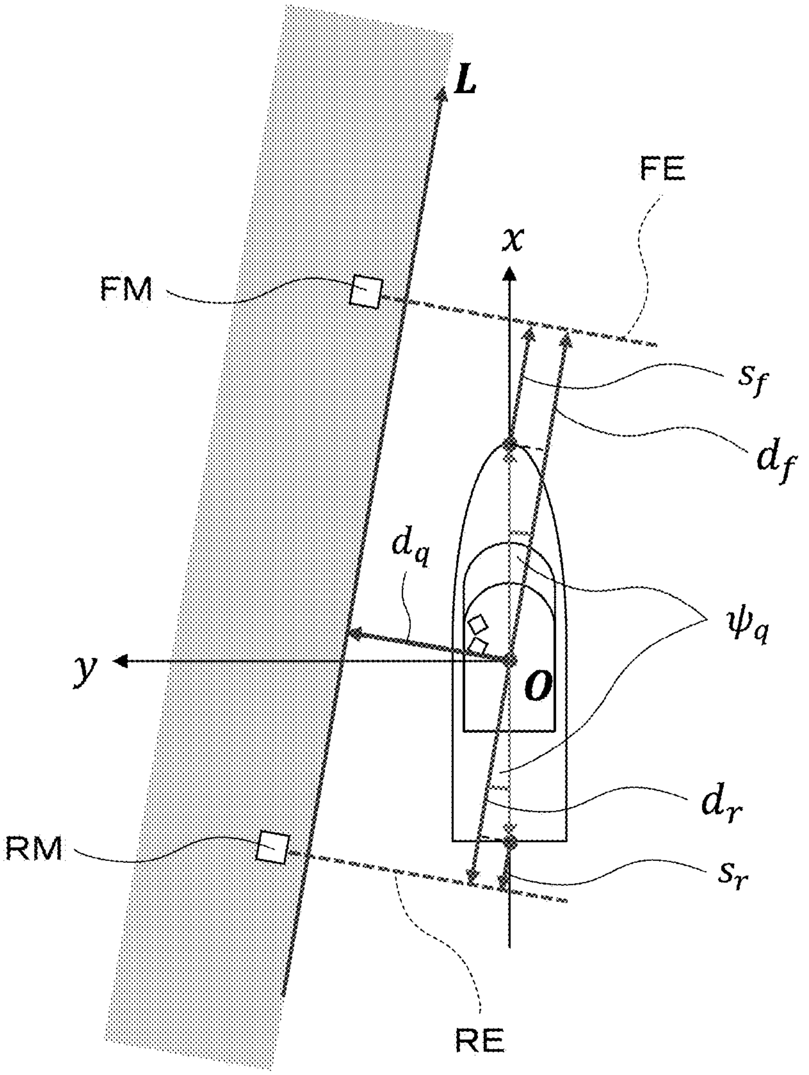
FIG. 9 is a top view showing a distance $s_f$, a distance $s_r$ and a distance $d_q$.

According to the process described above, for example, the distance $s_f$, the distance $s_r$ and the distance $d_q$ as shown in FIG. 9 are calculated. FIG. 9 is a top view showing the distance $s_f$, the distance $s_r$ and the distance $d_q$.

Figure 10A:
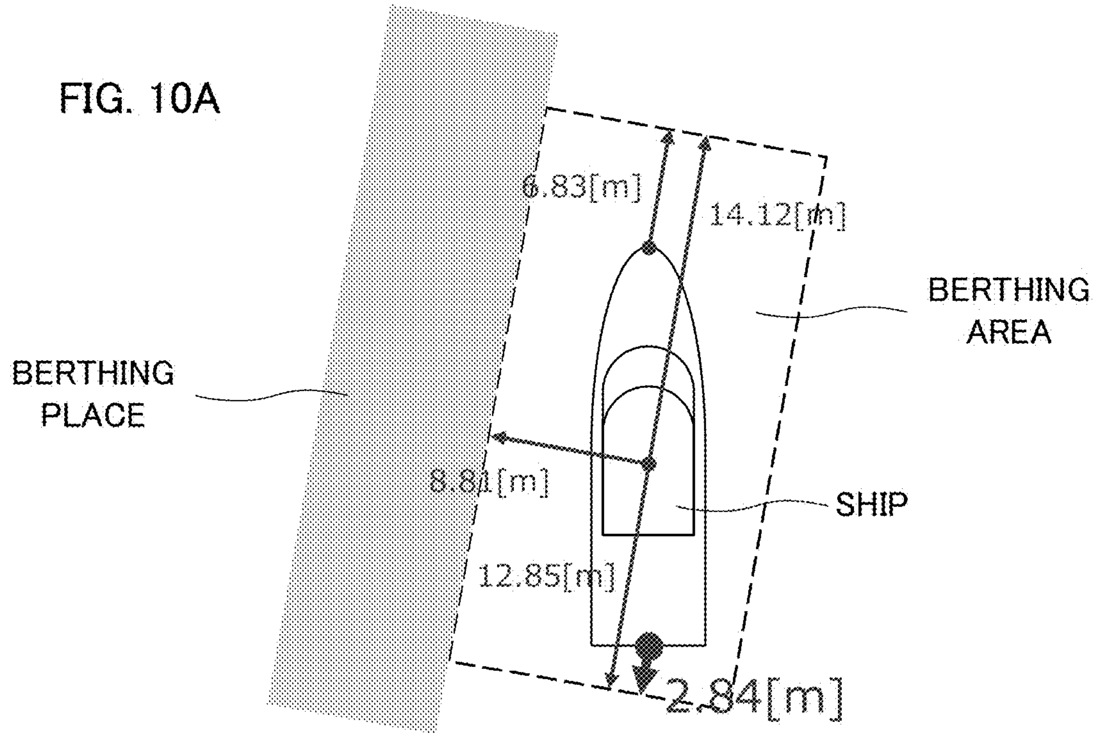
FIG. 10A is a diagram showing a display example of the berthing support information.
Figure 10B:
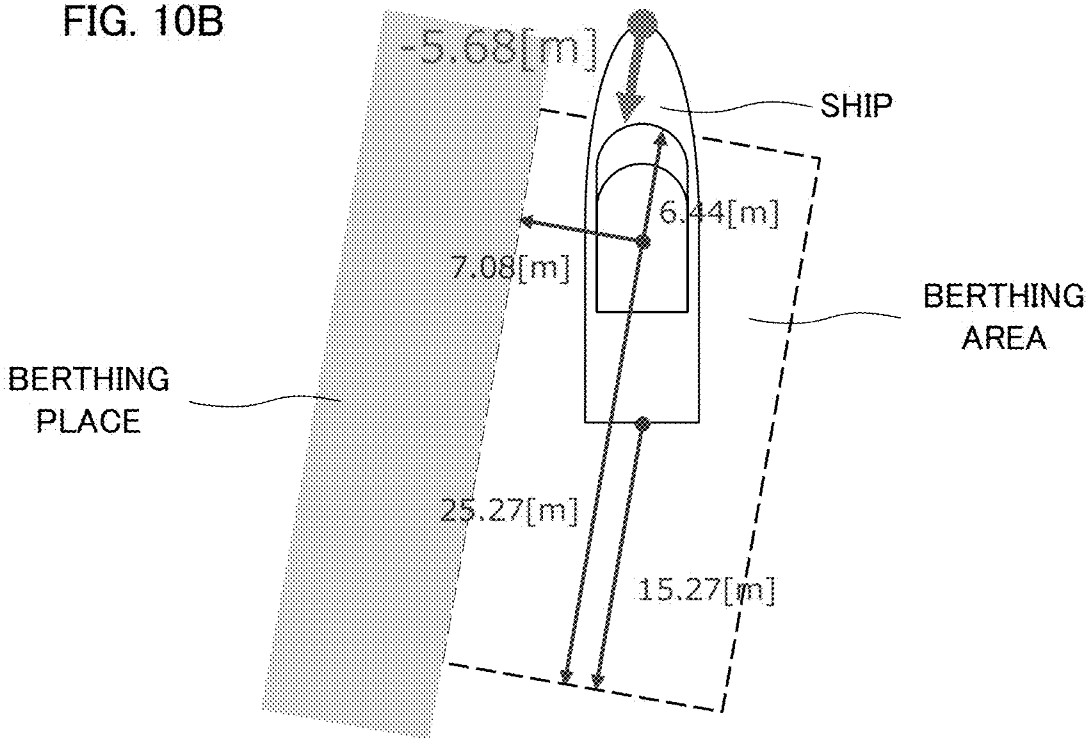
FIG. 10B is a diagram showing a display example of the berthing support information.

The controller 13 generates an information display screen including information relating to the respective distances (the distance $d_f$, the distance $d_r$, the distance $s_f$, the distance $s_r$ and the distance $d_q$) which change according to the relative positional relationship between the current position of the target ship and the berthing area, and performs a process for displaying the generated information display screen on the monitor 14. According to such a process, for example, it is possible to display the information display screen including the berthing support information as shown in FIG. 10A or FIG. 10B on the monitor 14. FIGS. 10A and 10B are diagrams showing examples of displaying the berthing support information.

In the display examples shown in FIGS. 10A and 10B, it is possible to grasp the relative positional relation between the target ship, the berthing place, and the berthing area.

According to the display example shown in FIG. 10A, it is possible grasp that the distance $d_f$ is 14.12 meters, the distance $d_r$ is 12.85 meters, the distance $s_f$ is 6.83 meters, the distance $s_r$ is 2.84 meters, and the distance $d_q$ is 8.81 meters. Further, according to the display example shown in FIG. 10A, information relating to the distance other than the distance $s_r$ is displayed in a normal display mode. Further, according to the display example shown in the FIG. 10A, since the information relating to the distance $s_r$ is displayed in an alert display mode different from the normal display mode, it is possible to grasp that the stern of the target ship is close to the rear end RE of the berthing area. Further, according to the display example shown in FIG. 10A, the controller 13 may change the display mode of the information relating to the distance $s_r$ from the normal display mode to the alert display mode when the distance $s_r$ becomes equal to or smaller than a predetermined value.

For example, the alert display mode may be set as a display mode in which at least one of the respective display elements such as the color of the character, the size of the character, the color of the arrow (line segment) and the thickness of the arrow (line segment) is emphasized in comparison with the normal display mode. Specifically, for example, an arrow (line segment) included in the information display screen may be displayed with a predetermined line width in the normal display mode, and displayed with the line width larger than the predetermined line width in the alert display mode. Further, for example, a predetermined display element included in the information display screen may be displayed in blue in the normal display mode, and displayed in red in the alert display mode to strongly alert.

According to the display example shown in FIG. 10B, it is possible to grasp that the distance $d_f$ is 6.44 meters, the distance $d_r$ is 25.27 meters, the distance $s_f$ is −5.68 meters, the distance $s_r$ is 15.27 meters, and the distance $d_q$ is 7.08 meters. Further, according to the display example shown in the FIG. 10B, since the distance $s_f$ is a negative value, the information relating to the distance $s_f$ is displayed in red, which is the alert display mode strongly calling attention. Thus, it is possible to grasp that the bow of the target ship exceeds the front end FE of the berthing area. Further, according to the display example shown in FIG. 10B, the controller 13 may change the display mode of the information relating to the distance $s_f$ from the normal display mode to the alert display mode when the distance $s_f$ becomes equal to or smaller than a predetermined value.

According to the process described above, the display processing means performs the process for displaying the information relating to the distance from the bow of the ship to the front end of the berthing area and the information relating to the distance from the stern of the ship to the rear end of the berthing area on the display device. Further, according to the process described above, the display processing means performs the process for displaying information relating to the distance from the ship to the side surface of the quay of the berthing place on the display device.

In the case where three or more markers are installed in the berthing area, the markers at both front and rear ends indicating the berthing possible area may be targeted.

Further, for example, even when only one marker SM is installed in the berthing place SBP, if the front distance $d_{mf}$ corresponding to the distance from the marker SM to the front end FE and the rear distance $d_{mr}$ corresponding to the distance from the marker SM to the rear end RE are registered in the map data in advance, it is possible to calculate the distance $d_f$ and the distance $d_r$.

Figure 10C:
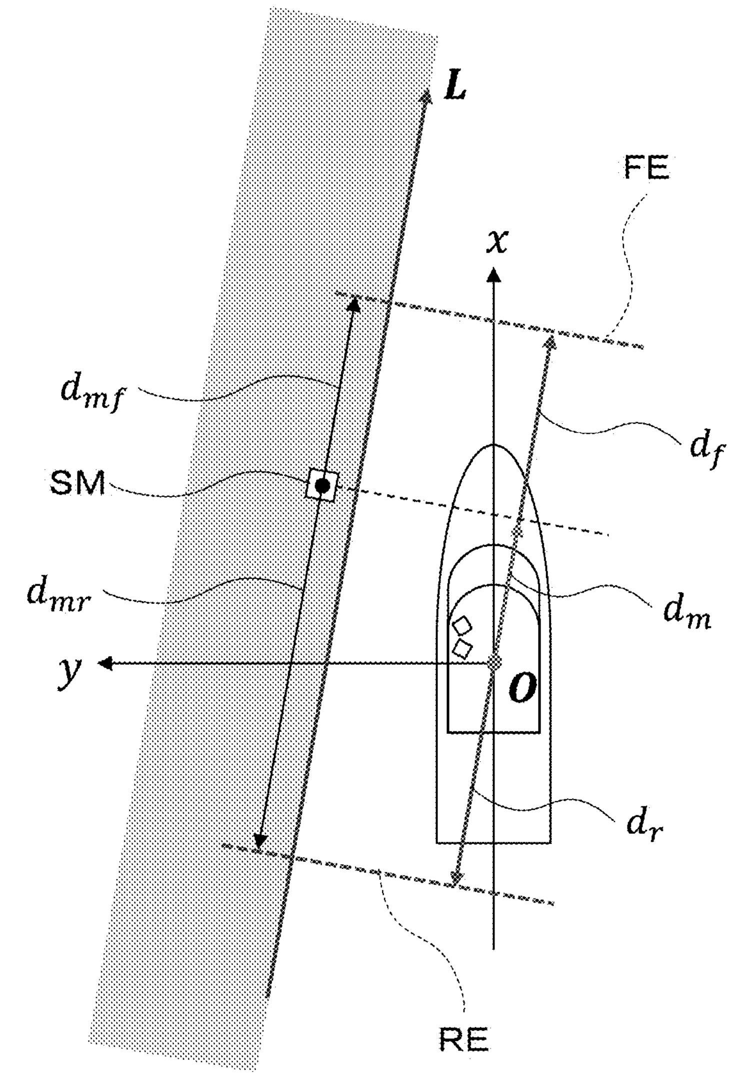
FIG. 10C is a top view showing a distance $d_m$, a front distance $d_{mf}$ and a rear distance $d_{mr}$.

Specifically, when the target ship approaches the berthing place SBP, the controller 13 acquires the front distance $d_{mf}$ and the rear distance $d_{mr}$ by referring to the map data stored in the memory 12, for example. Further, the controller 13 calculates the distance $d_m$ corresponding to the distance from the origin O to the marker SM in the direction parallel to the berthing side straight line L. The controller 13 calculates the distance $d_f$ by applying the distance $d_m$ and the front distance $d_{mf}$ to the following Formula (8). Further, the controller 13 calculates the distance $d_r$ by applying the distance $d_m$ and the rear distance $d_{mr}$ to the following Formula (9). Incidentally, the distance $d_m$, the front distance $d_{mf}$ and the rear distance $d_{mr}$ are represented, for example, as shown in FIG. 10C. FIG. 10C is a top view showing the distance $d_m$, the front distance $d_{mf}$ and the rear distance $d_{mr}$.

[Formula 8]

$$d_f = d_{mf} + d_m \tag{8}$$

[Formula 9]

$$d_r = d_{mr} - d_m \tag{9}$$

Incidentally, for example, when the latitude and longitude of each of the four vertices TP constituting the berthing area are registered in advance in the map data, and the receiver of GNSS (Global Navigation Satellite System) signal is provided on the target ship, the controller 13 may calculate each of the distances (the distance $d_f$, the distance $d_r$, the distance $s_f$, the distance $s_r$ and the distance $d_q$) used for generating the information display screen by performing the following process.

Figure 10D:
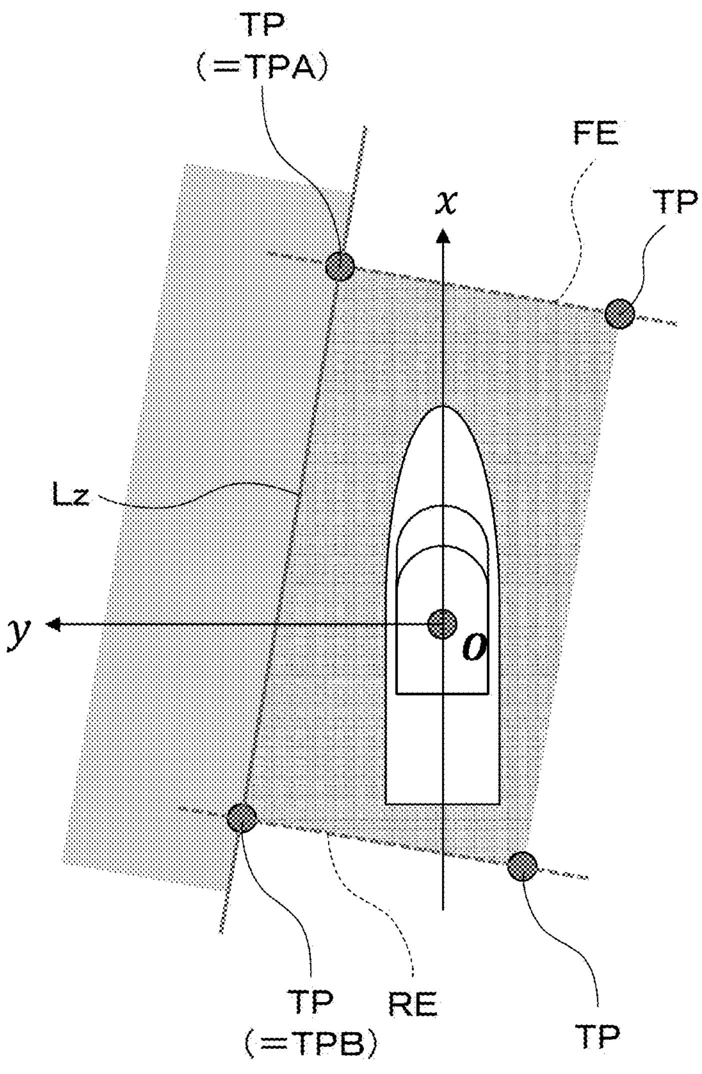
FIG. 10D is a top view showing vertices TP and a straight line Lz.

The controller 13 sets the ship coordinate system in which the latitude and longitude of the target ship determined on the basis of the GNSS signal is set to the origin O, and converts the latitude and longitude of each of the four vertices TP constituting the berthing area into the coordinate positions in the ship coordinate system. The controller 13 also generate a straight line Lz that pass through the coordinate positions of the two vertices TPA and TPB close to the quay, which is the berthing place, among the four vertices TP constituting the berthing area. Then, while using the straight line Lz as the berthing side straight line L, the controller 13 can calculate the distances (the distance $d_f$, the distance $d_r$, the distance $s_f$, the distance $s_r$ and the distance $d_q$) used for generating the information display screen by performing the same processing as described above. FIG. 10D is a top view showing the vertices TP and the straight line Lz.

(2nd Display Method)

The controller 13 calculates the distance $d_q$, the distance $d_f$, and the distance $d_r$ by performing the same processing as described in the first display method. Further, the controller 13 calculates the speed $v_q$ corresponding to the speed at which the target ship moves in the direction of the quay of the berthing area (the berthing speed) and the speed $v_{fr}$ corresponding to the speed at which the target ship moves in the front and rear direction of the berthing area, respectively, based on the time change of the distance $d_q$, the distance $d_f$, and the distance $d_r$. The controller 13 calculates the speed v corresponding to the moving speed of the target ship by combining the speed $v_q$ and the speed $v_{fr}$.

Specifically, by applying the distance $d_q(k-1)$ at the time t(k−1) and the distance $d_q(k)$ at the time t(k) (one time point after the time t(k−1)) to the following Formula (10), the controller 13 calculates the speed $v_q(k)$ at the time t(k). By applying the distance $d_f(k-1)$ and the distance $d_r(k-1)$ at the time t(k−1) and the distance $d_f(k)$ and distance $d_r(k)$ at the time t(k) to the following Formula (11), the controller 13 calculates the speed $v_{fr}(k)$ at the time t(k). By applying the speed $v_q(k)$ calculated using the following Formula (10) and the speed $v_{fr}(k)$ calculated using the following formula (11) to the following Formula (12), the controller 13 calculates the speed v(k) at the time t(k). Incidentally, "1/(τs+1)" in the following Formulas (10) and (11) shows a low-pass filter of the first-order delay system constructed using the time constant "τ" and Laplace operator "s".

[Formula 10]

$$v_q(k) = \frac{1}{\tau s + 1}\frac{d_q(k) - d_q(k-1)}{t(k) - t(k-1)} \tag{10}$$

[Formula 11]

$$v_{fr}(k) = \frac{1}{\tau s + 1}\frac{\frac{1}{2}[\{d_f(k) - d_f(k-1)\} - \{d_r(k) - d_r(k-1)\}]}{t(k) - t(k-1)} \tag{11}$$

[Formula 12]

$$v(k) = \sqrt{v_q(k)^2 + v_{fr}(k)^2} \tag{12}$$

Figure 11:
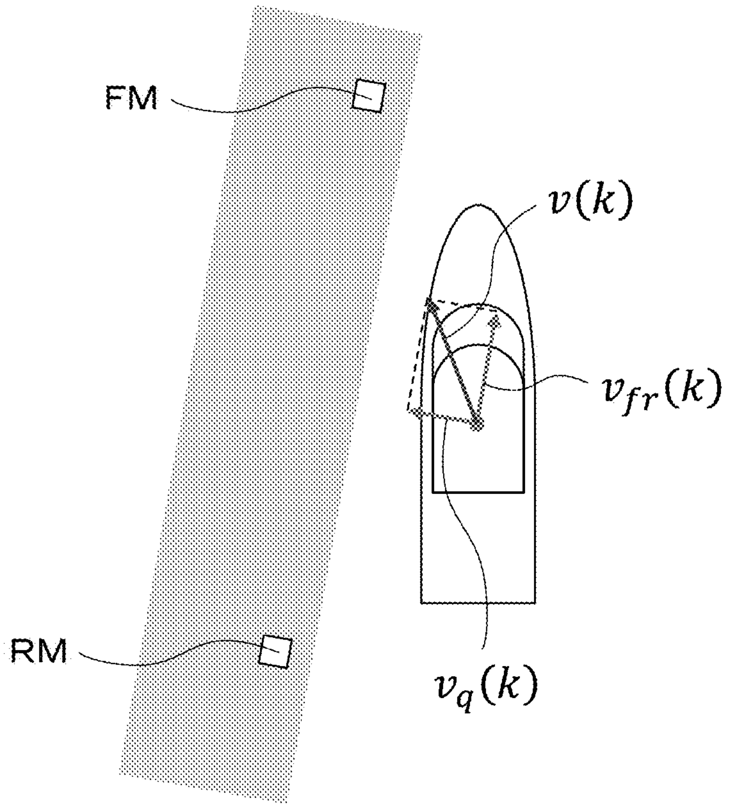
FIG. 11 is a top view illustrating speed $v_q(k)$, speed $v_{fr}(k)$ and speed v(k).

According to the process described above, for example, the speed $v_q(k)$, the speed $v_{fr}(k)$ and the speed v(k) as shown in FIG. 11 are calculated. FIG. 11 is a top view illustrating the speed $v_q(k)$, the speed $v_{fr}(k)$ and the speed v(k).

Figure 12A:
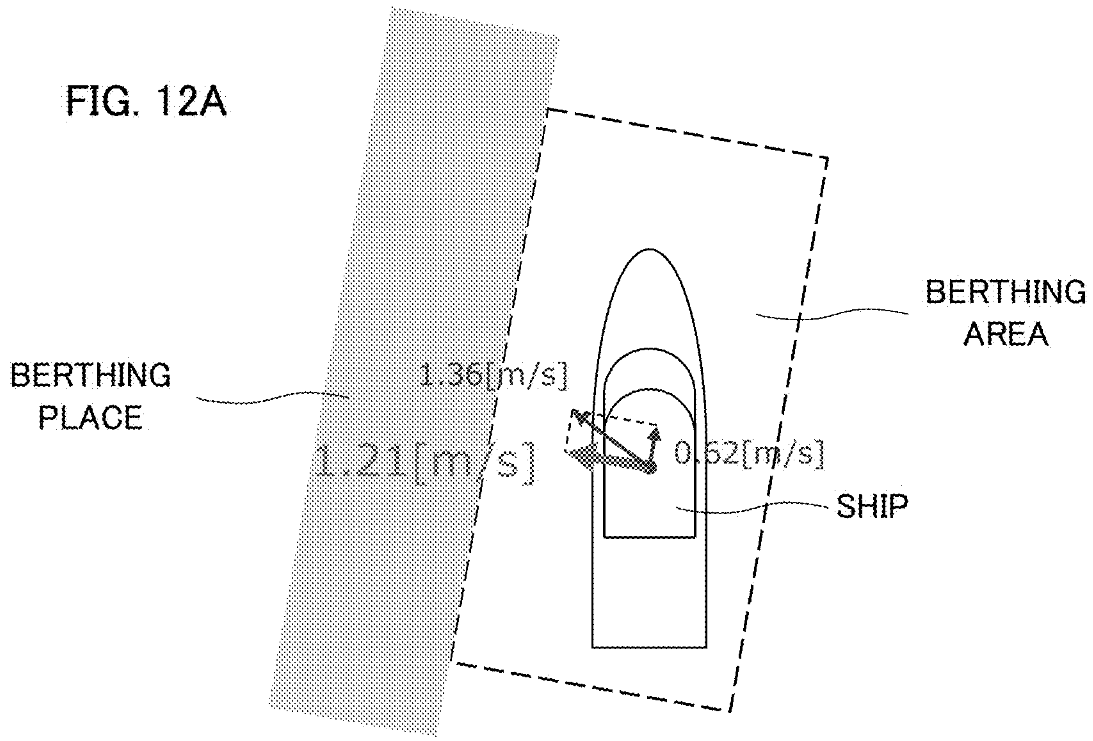
FIG. 12A is a diagram showing a display example of the berthing support information.
Figure 12B:
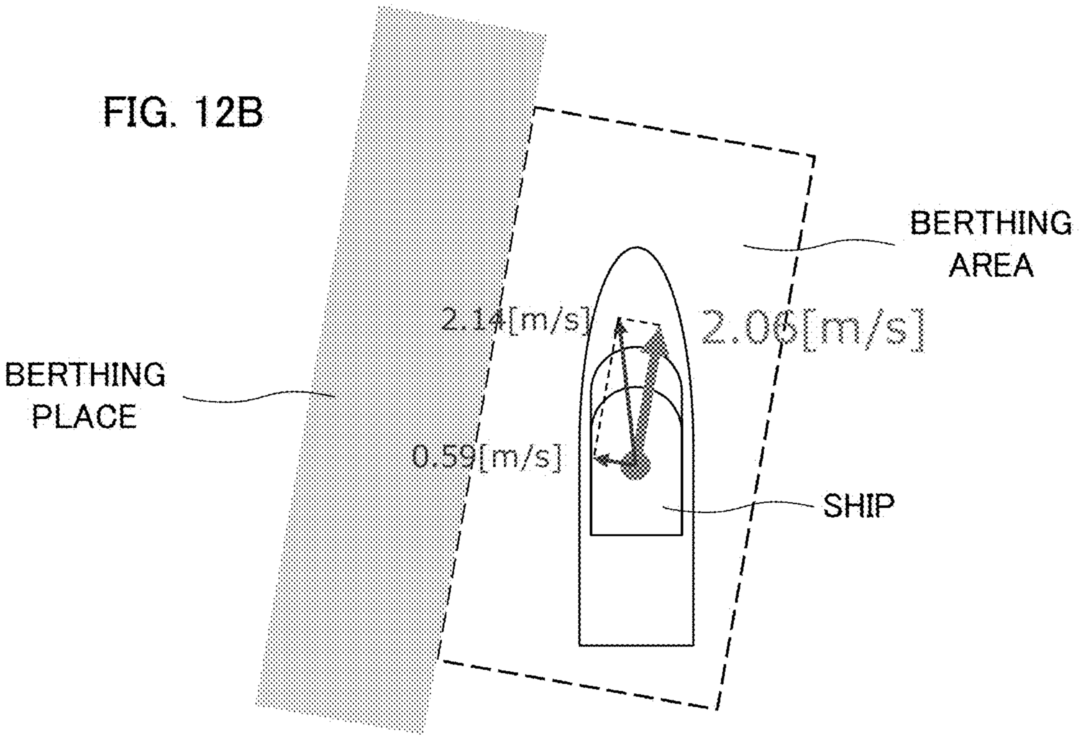
FIG. 12B is a diagram showing a display example of the berthing support information.

The controller 13 generates an information display screen including information related to the speed $v_q(k)$, the speed $v_{fr}(k)$ and the speed v(k), and performs a process for displaying the generated information display screen on the monitor 14. According to such a process, for example, it is possible to display the information display screen including the berthing support information as shown in FIG. 12A or FIG. 12B on the monitor 14. FIG. 12A and FIG. 12B are diagrams showing examples of displaying the berthing support information.

According to FIG. 12A and FIG. 12B, it is possible to grasp the relative positional relation between the target ship, the berthing place, and the berthing area.

According to the display example shown in FIG. 12A, it is possible to grasp that the speed $v_q$ is 1.21 m/s, the speed $v_{fr}$ is 0.62 m/s, and the speed v is 1.36 m/s. Further, according to the display example shown in FIG. 12A, the information relating to the speed other than the speed $v_q$ is displayed in a normal display mode. Further, according to the display example shown in the FIG. 12A, since the information relating to the speed $v_q$ is displayed in an alert display mode different from the normal display mode, it is possible to grasp that the speed of the target ship moving to the left direction of the berthing area is excessive. Further, according to the display example shown in FIG. 12A, when the speed $v_q$ exceeds a predetermined value, the controller 13 may change the display mode of the information relating to the speed $v_q$ from the normal display mode to the alert display mode. Alternatively, when the ratio of the speed $v_q$ to the distance $d_q$ exceeds a predetermined value, the controller 13 may change the display mode of the information relating to the speed $v_q$ from the normal display mode to the alert display mode.

According to the display example shown in FIG. 12B, it is possible to grasp that the speed $v_q$ is 0.59 m/s, the speed $v_{fr}$ is 2.06 m/s, and the speed v is 2.14 m/s. Further, according to the display example shown in FIG. 12B, information relating to the speed other than the speed $v_{fr}$ is displayed in a normal display mode. Further, according to the display example shown in the FIG. 12B, since the information relating to the speed $v_{fr}$ is displayed in the alert display mode, it is possible to grasp that the speed of the target ship moving forward of the berthing area is excessive. Further, according to the display example shown in FIG. 12B, when the speed $v_{fr}$ exceeds a predetermined value, the controller 13 may change the display mode of the information according to the speed $v_{fr}$ from the normal display mode to the alert display mode. Alternatively, when either the ratio of the speed $v_{fr}$ to the distance $d_f$ or the ratio of the speed $v_{fr}$ to the distance $d_r$ exceeds a predetermined value, the controller 13 may change the display mode of the information relating to the speed $v_{fr}$ from the normal display mode to the alert display mode.

According to the process described above, the display processing means performs the process for displaying the information relating to the speed at which the ship moves in the quay direction of the berthing area and the information relating to the speed at which the ship moves in the front and rear direction of the berthing area on the display device. Further, according to the process described above, the display processing means performs the process for displaying information related to the speed at which the ship approaches the berthing place on the display device.

In the present display method, for example, the controller 13 may calculate a risk level that is an index indicating the risk when the target ship approaches the berthing place based on at least one of the speed $v_q$, the speed $v_{fr}$, and the speed v, and the total length of the target ship, and may perform a process for displaying information related to the calculated risk level. In addition, in the process relating to the calculation of the risk, a process based on information disclosed in the following URLs or the like may be used:

https://www.meiwakaiun.com/meiwaplus/tips/tips-vol62/
http://www.srcj.or.jp/pdf/SRC%20News%20No26.pdf.

(3rd Display Method)

Figure 13A:
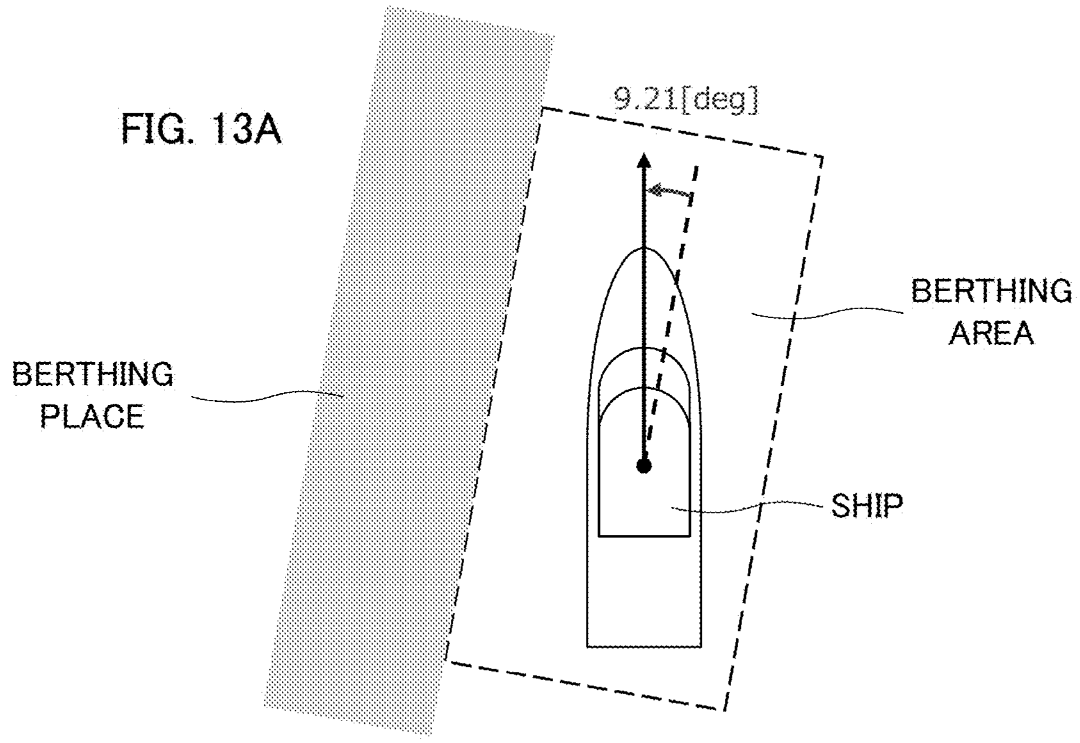
FIG. 13A is a diagram showing a display example of the berthing support information.
Figure 13B:
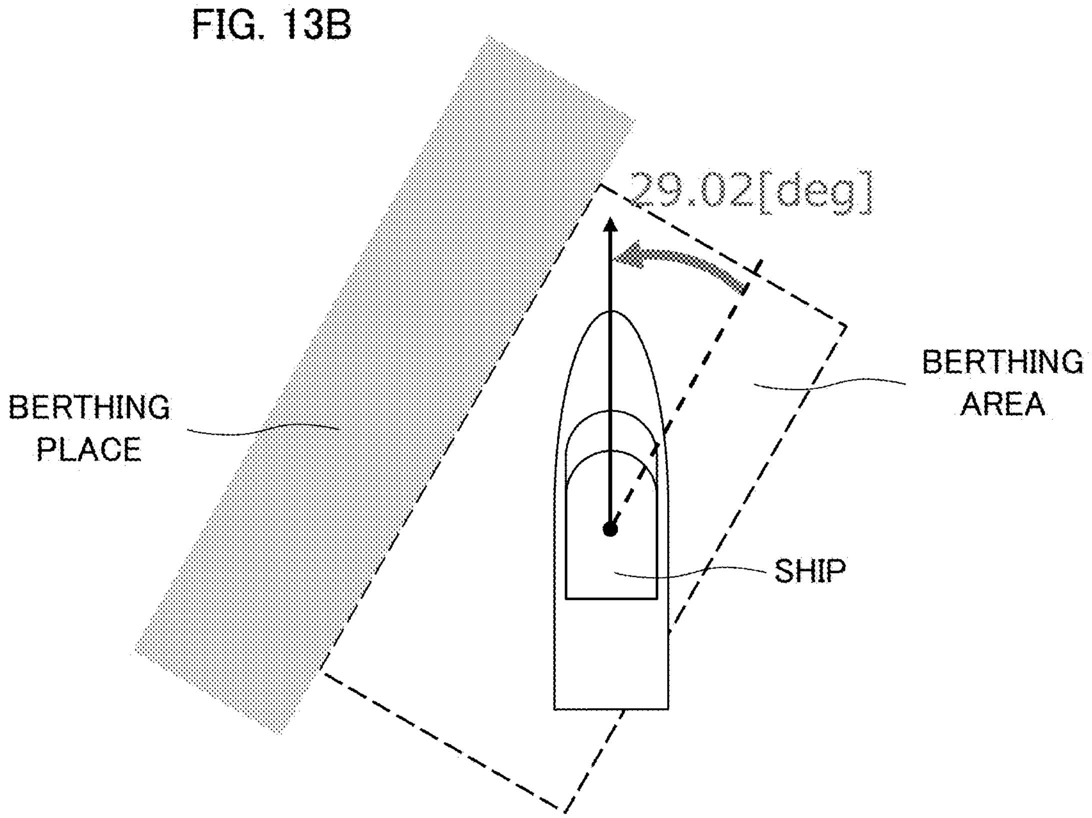
FIG. 13B is a diagram showing a display example of the berthing support information.

The controller 13 calculates the angle $\Psi_q$ by performing the same process as described in the first display method. The controller 13 generates an information display screen including information relating to the angle $\Psi_q$, and performs a process for displaying the generated information display screen on the monitor 14. According to such a process, for example, it is possible to display the information display screen including the berthing support information as shown in FIG. 13A or FIG. 13B on the monitor 14. FIG. 13A and FIG. 13B are diagrams showing display examples of the berthing support information.

According to the display examples shown in FIG. 13A and FIG. 13B, it is possible to grasp the relative positional relation between the target ship, the berthing place, and the berthing area. Further, according to the display examples shown in FIG. 13A and FIG. 13B, the straight line corresponding to the berthing side straight line L is indicated by a broken line.

According to the display example shown in FIG. 13A, it is possible to grasp that the angle $\Psi_q$ is 9.21°. Further, according to the display example shown in FIG. 13A, information relating to the angle $\Psi_q$ is displayed in a normal display mode.

According to the display example shown in FIG. 13B, it is possible to grasp that the angle $\Psi_q$ is 29.02°. Further, according to the display example shown in FIG. 13B, since the information relating to the angle $\Psi_q$ is displayed in an alert display mode different from the normal display mode, it is possible to grasp that the angle of the target ship with respect to the berthing place is excessive. Further, according to the display example shown in FIG. 13B, when the angle $\Psi_q$ exceeds a predetermined value, the controller 13 may change the display mode of the information relating to the angle $\Psi_q$ from the normal display mode to the alert display mode. Alternatively, when the ratio of the angle $\Psi_q$ to the distance $d_q$ exceeds a predetermined value, the controller 13 may change the display mode of the information relating to the angle $\Psi_q$ from the normal display mode to the alert display mode.

According to the process described above, the display processing means performs the process for displaying information relating to the angle indicating the direction of the ship with respect to the side surface of the quay of the berthing place on the display device.

(4th Display Method)

Figure 14A:
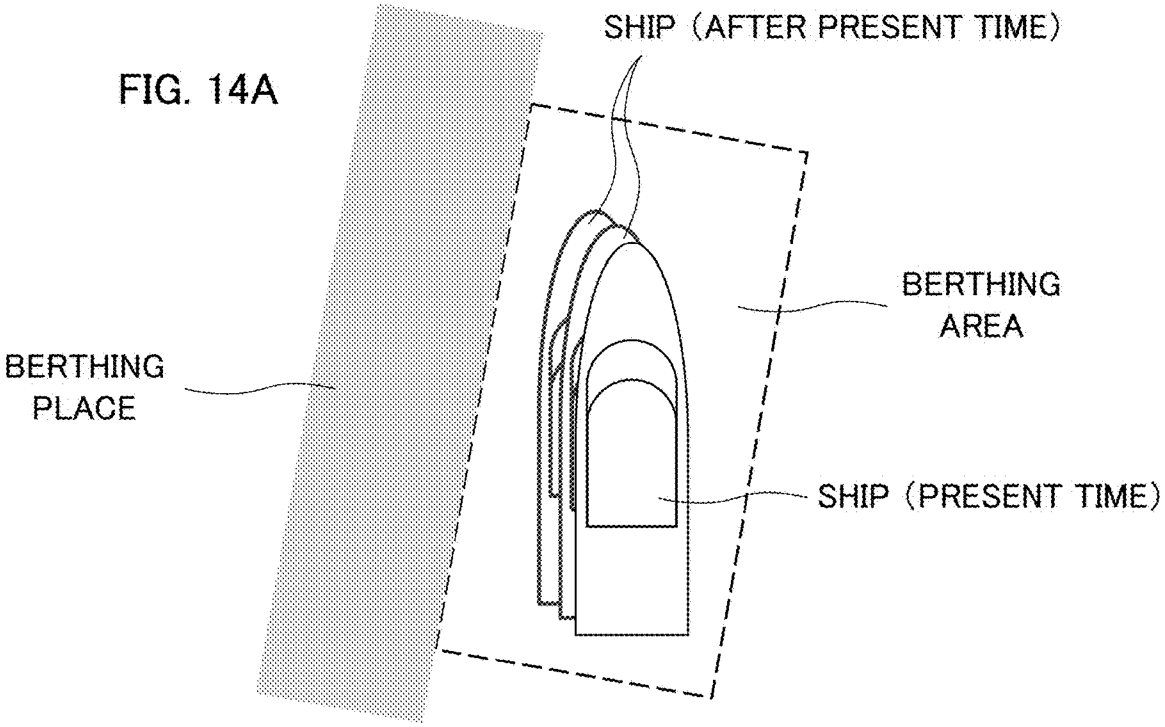
FIG. 14A is a diagram showing a display example of the berthing support information.
Figure 14B:
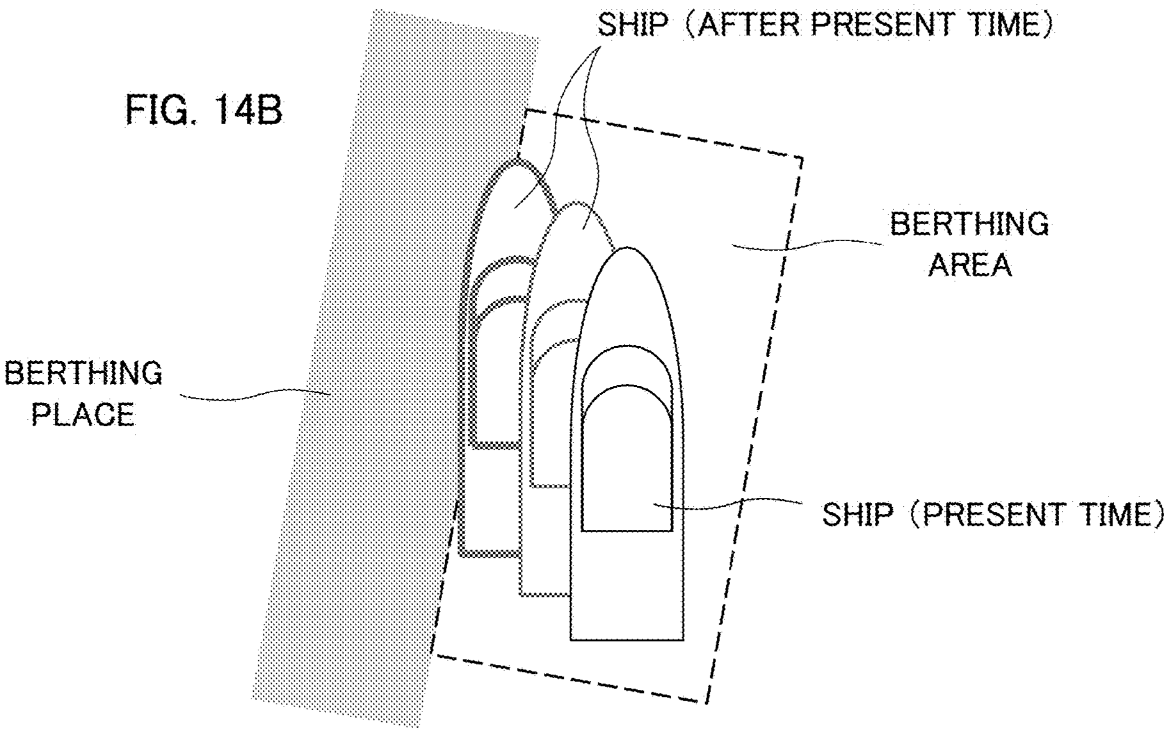
FIG. 14B is a diagram showing a display example of the berthing support information.

The controller 13 calculates the distance $d_f$, the distance $d_r$, the distance $d_q$, and the angle $\Psi_q$ by performing the same processing as that described in the first display method. The controller 13 calculates the speed v by performing the same processing as that described in the second display method. Further, the controller 13 calculates the predicted position and the predicted attitude of the target ship moving in the berthing area from the present time to the time after a predetermined time elapsed, based on the distance $d_f$, the distance $d_r$, the distance $d_q$, the angle $\Psi_q$, and the speed v. Further, the controller 13 generates an information display screen including information relating to the predicted position and the predicted attitude of the target ship calculated as described above, and performs a process for displaying the generated information display screen on the monitor 14. According to such a process, for example, it is possible to display the information display screen including the berthing support information as shown in FIG. 14A or FIG. 14B on the monitor 14. FIG. 14A and FIG. 14B are diagrams showing display examples of the berthing support information.

According to FIG. 14A and FIG. 14B, it is possible to grasp the relative positional relation between the target ship, the berthing place, and the berthing area. Further, according to the display examples shown in FIG. 14A and FIG. 14B, it is possible to grasp the position and the attitude of the target ship in the berthing area at the present time and the predicted position and the predicted attitude of the target ship at a time later than the present time.

According to the display example shown in FIG. 14A, since the predicted position and the predicted attitude of the target ship at a time later than the present time are displayed in the normal display mode, it is possible to grasp that the target ship moves to a position that does not exceed the edge of the berthing area at the time when the predetermined time has elapsed from the present time.

According to the display example shown in FIG. 14B, since the predicted position and the predicted attitude of the target ship at a time later than the present time are displayed in the alert display mode, it is possible to grasp that the target ship may reach the edge of the berthing area during the period from the present time to the time after the lapse of the predetermined time.

According to the process described above, the display processing means performs the process for displaying the information relating to the predicted position and the predicted attitude of the ship at the time from the present time to the time when the predetermined time has elapsed on the display device as the information relating to the ship moving in the berthing area.

(5th Display Method)

Figure 15A:
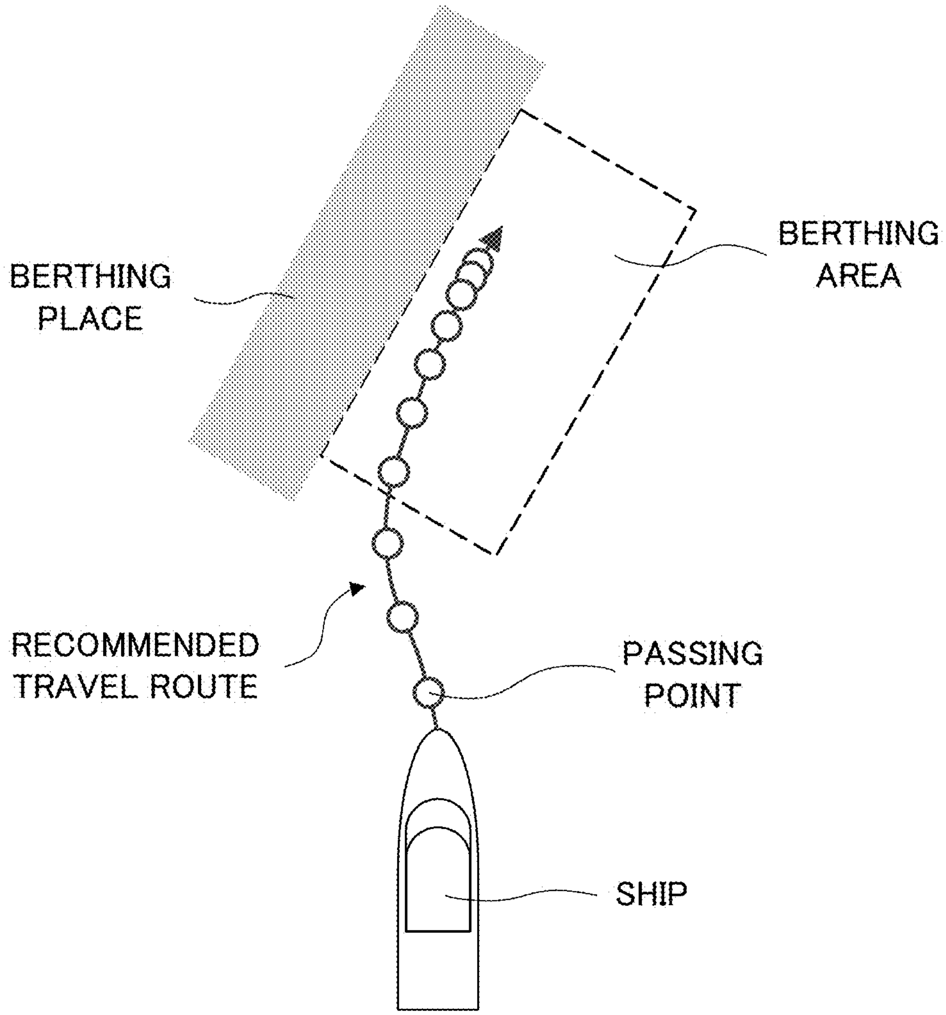
FIG. 15A is a diagram showing a display example of the berthing support information.
Figure 15B:
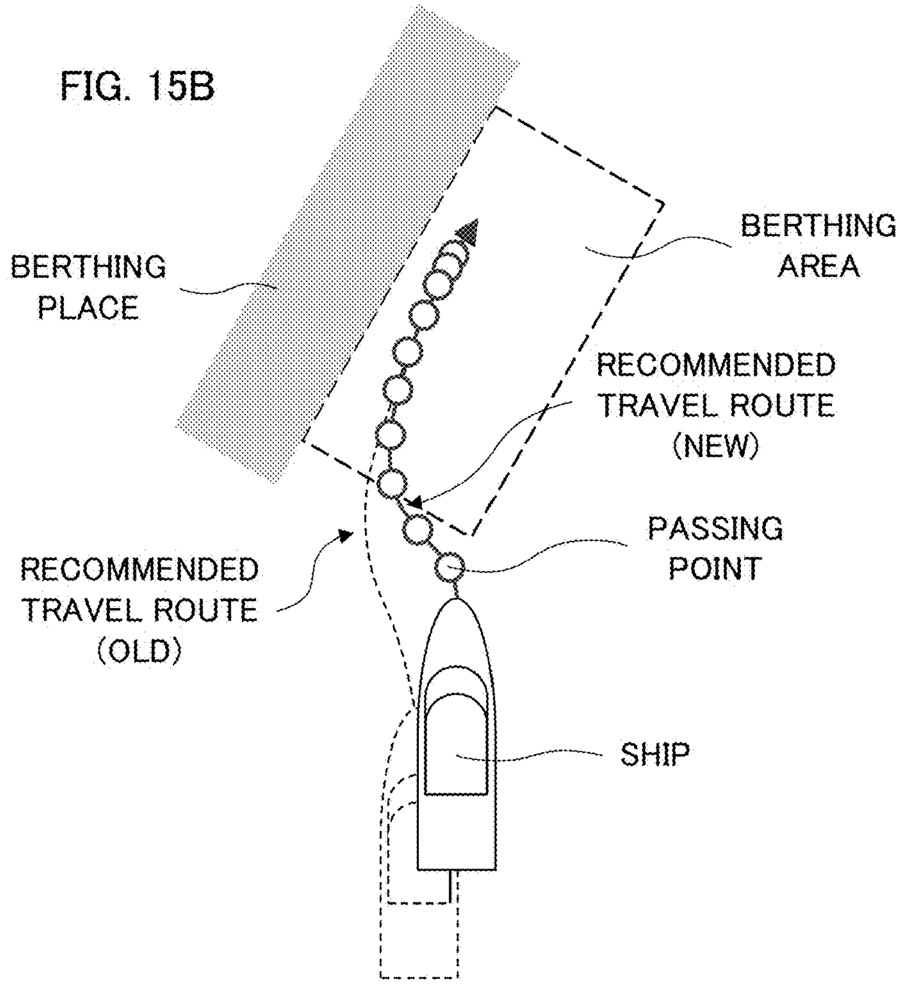
FIG. 15B is a diagram showing a display example of the berthing support information.
Figure 15C:
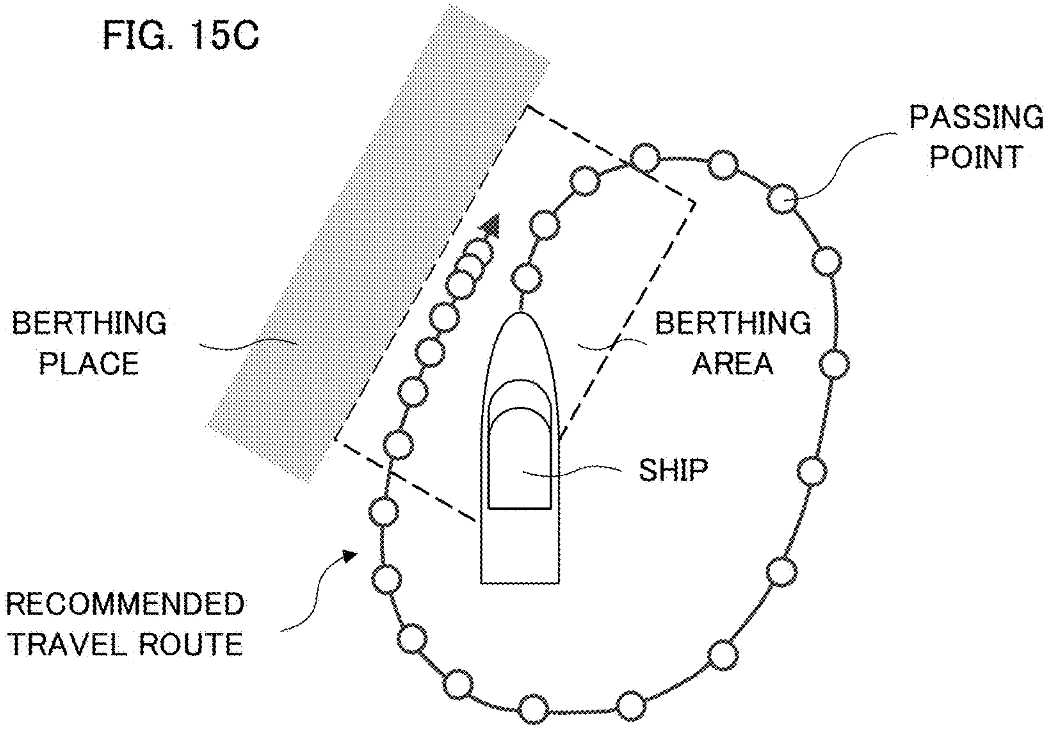
FIG. 15C is a diagram showing a display example of the berthing support information.

The controller 13 calculates the distance $d_f$, the distance $d_r$, the distance $d_q$, and the angle $\Psi_q$ by performing the same processing as that described in the first display method. The controller 13 calculates the speed v by performing the same processing as that described in the second display method. Further, the controller 13 calculates a recommended travel route for guiding the target ship moving in or around the berthing area from its current position to a predetermined berthing position within the berthing area, on the basis of the distance $d_f$, the distance $d_r$, the distance $d_q$, and the angle $\Psi_q$ and the speed v. Further, the controller 13 generates an information display screen including information relating to the recommended travel route calculated as described above, and performs a process for displaying the generated information display screen on the monitor 14. According to such a process, for example, an information display screen including the berthing support information as shown in FIG. 15A, FIG. 15B or FIG. 15C can be displayed on the monitor 14. FIG. 15A, FIG. 15B, and FIG. 15C are diagrams showing display examples of the berthing support information.

According to FIGS. 15A to 15C, it is possible to grasp the relative positional relation between the target ship, the berthing place, and the berthing area. Further, according to the display examples shown in FIGS. 15A to 15C, since the recommended travel route is displayed as an arrow (line segment), it is possible to grasp the steering direction when moving the target ship to the berthing area. Further, according to the display examples shown in FIGS. 15A to 15C, since a plurality of passing points on the recommended travel route are displayed by circles, it is possible to grasp the speed for moving the target ship to the berthing area based on the number and interval of the circles.

In this display method, for example, when the steering direction of the target ship deviates from the recommended travel route shown in FIG. 15A, the recommended travel route can be corrected (recalculated) to display a new recommended travel route as shown in FIG. 15B. Further, in this display method, for example, when the steering direction of the target ship deviates significantly from the recommended travel route shown in FIG. 15A and the berthing of the target ship is in trouble, a new recommended travel route as shown in FIG. 15C can be displayed by correcting (recalculating) the recommended travel route.

According to the process described above, the display processing means performs the process for displaying the information on the route for guiding the ship moving in and around the berthing area from its current position to a predetermined berthing position in the berthing area on the display device.

[Processing Flow]

Figure 16:
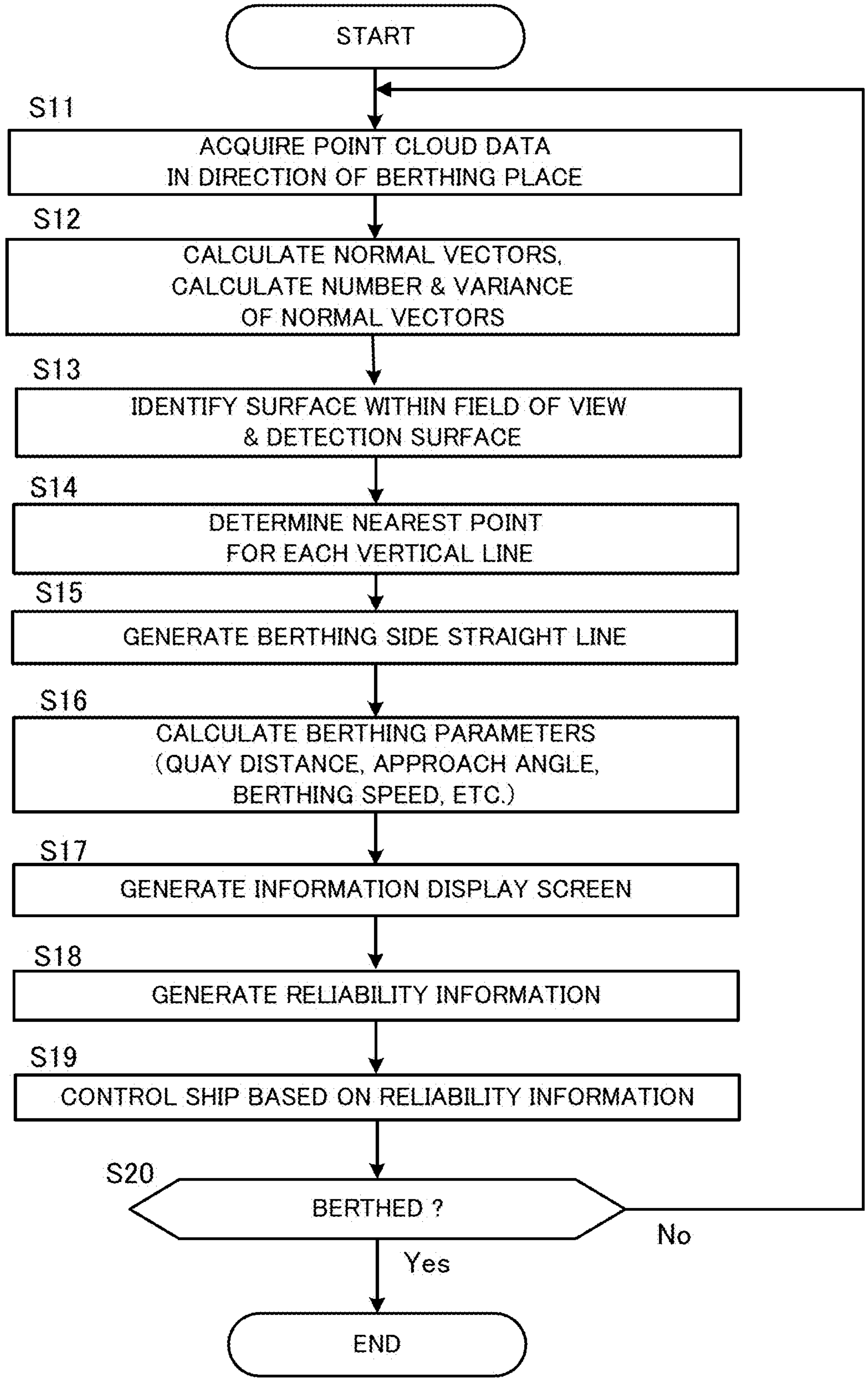
FIG. 16 is a flowchart showing an outline of berthing support processing.

FIG. 16 is a flowchart showing an outline of the berthing support processing in the present embodiment. The information processing device 1 repeatedly executes the processing of the flowchart shown in FIG. 16.

First, the information processing device 1 acquires point cloud data in the direction of the berthing place (step S11). In this case, for example, the information processing device 1 acquires the point cloud data generated by the lidar 3 which include the berthing side of the target ship in the measurement range. The information processing device 1 may further perform down-sampling of the acquired point cloud data and removal of the data reflected at the water surface.

Next, the berthing place detection unit 15 of the information processing device 1 calculates the normal vectors based on the point cloud data acquired in step S11 (step S12). Further, the berthing place detection unit 15 calculates the number of the normal vectors and the variance of the normal vectors in step S12. Further, the berthing place detection unit 15 identifies the surface within field of view and the detection surface, based on the result of the process in step S12 (step S13).

Next, the berthing parameter calculation unit 16 performs the nearest neighbor search for each vertical line on the basis of the point cloud data acquired in step S11 and calculates the nearest neighbor point for each vertical line (step S14).

Next, the berthing parameter calculation unit 16 generates the berthing side straight line L using the nearest neighbor point for each of the vertical lines obtained in step S14 (step S15).

Next, the berthing parameter calculation unit 16 calculates the quay distance, the approach angle, and the berthing speed, which are the berthing parameters, using the berthing side straight line L calculated in step S15 (step S16). Specifically, in step S16, the berthing parameter calculation unit 16 calculates the distance $d_q$ as the quay distance, calculates the angle $\Psi_q$ as the approach angle, and calculates the speed $v_q$ as the berthing speed. In addition, the display processing unit 17 generates an information display screen including information relating to the parameters calculated in step S16 by performing the process according to at least one of the first to fifth display methods (step S17), and displays the generated information display screen on the monitor 14. According to the present embodiment, the necessity of displaying the information on the information display screen generated by in step S17 may be selected according to the user's instruction.

Then, the berthing parameter calculation unit 16 generates reliability information on the basis of the identification result of the surface within field of view and the detection surface in step S13 and the calculation result of the berthing parameters in step S16 (step S18). Thereafter, the information processing device 1 performs control of the ship based on the reliability information (step S19). Thus, the information processing device 1 can accurately perform the control of the ship relating to the berthing on the basis of the reliability accurately reflecting the berthing situation.

Then, the information processing device 1 determines whether or not the target ship is berthed (step S20). In this case, for example, the information processing device 1 determines whether or not the target ship is berthed, based on the output signal of the sensor group 2 or a user input via the interface 11. Then, the information processing device 1 terminates the processing of the flowchart when it is determined that the target ship is berthed (step S20: Yes). On the other hand, when the target ship is not berthed (step S21: No), the information processing device 1 returns to the process of step S11.

[Modification]

The controller 13 may grasp the portion (proximate portion) of the hull closest to the quay and the shortest distance from the proximate portion to the quay, and use them for steering the ship at the time of docking and undocking.

In this case, the controller 13 determines the proximate portion and the shortest distance described above by the following Step 1 to Step 3.

(Step 1) Calculate the distance from a plurality of points (also called "contour point Po") representing the contour of the ship to the berthing side straight line L.

(Step 2) Extract the minimum value of the distances from the calculated contour points Po to the berthing side straight line L.

(Step 3) Determine the minimum value to be the shortest distance to the quay and the contour point Po to be the proximate portion to the quay.

Figure 17A:
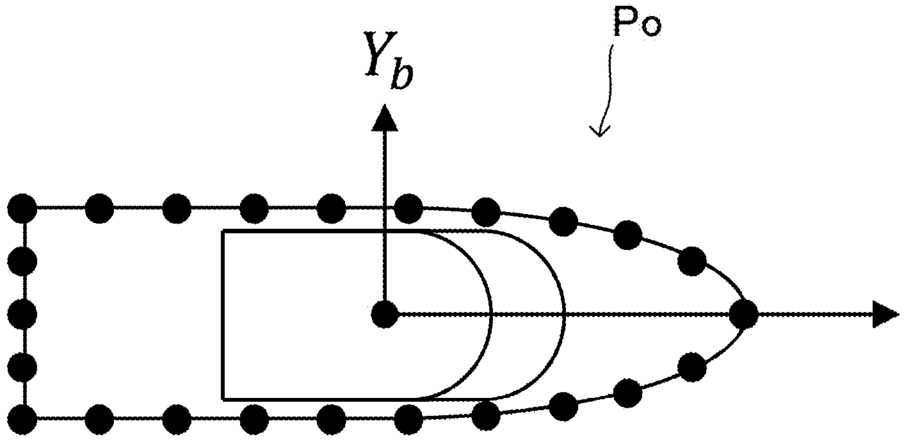
FIG. 17A is a bird's-eye view of the target ship showing contour points Po.

FIG. 17A is a bird's-eye view of the target ship showing the contour points Po. For example, the memory 12 stores contour data which is position data indicating the contour positions of the target ship. The contour data includes a plurality of contour point Po (24 in this case) representing the contour of the target ship recorded as the coordinates of the ship coordinate system. Here, the front (forward) direction of the target ship is defined as the "$X_b$" coordinate, the side direction of the target ship is defined as the "$Y_b$" coordinate, and the vertical direction of the target ship is defined as the "$Z_b$" coordinate. The measurement data of the coordinate system with reference to the lidar 3, which is measured by the lidar 3, is converted into the ship coordinate system. Incidentally, the processing of converting the point cloud data of the coordinate system based on the lidar installed in a mobile body to the coordinate system of the mobile body is disclosed in the International Publication WO2019/188745 and the like.

Figure 17B:
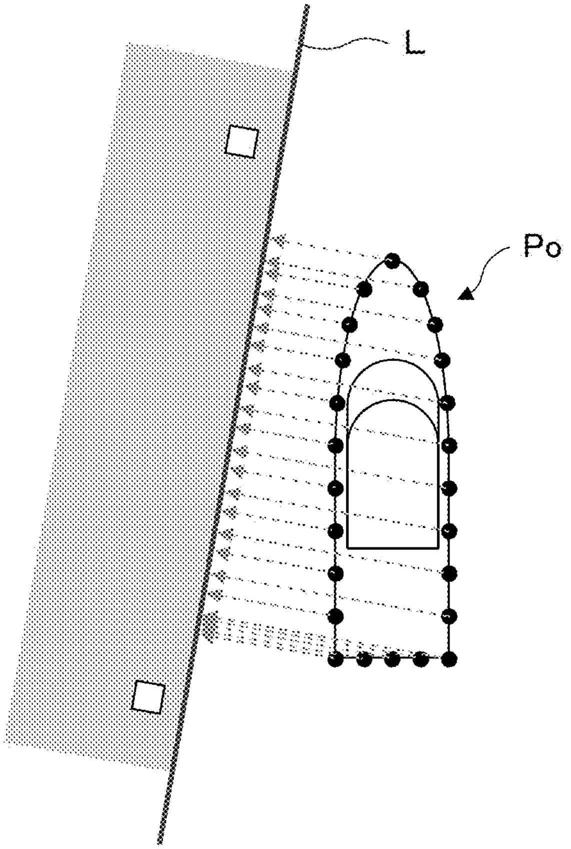
FIG. 17B shows distances from the contour points Po to the berthing side straight line L by arrows.
Figure 17C:
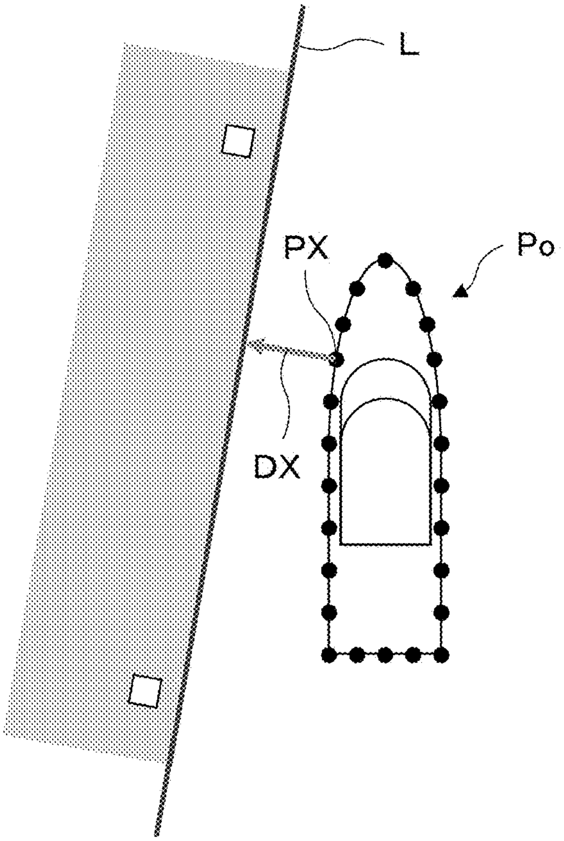
FIG. 17C shows a proximate portion PX to the quay and a shortest distance DX to the quay.

FIG. 17B shows the distances from the contour points Po to the berthing side straight line L by the arrows. These distances are obtained by calculating the length of the perpendicular from each contour point Po to the berthing side straight line L, similarly to the methods described above. Here, the arrows indicating the above distances for 24 contour points Po are shown. FIG. 17C shows the proximate portion PX to the quay and the shortest distance DX to the quay.

Figure 17D:
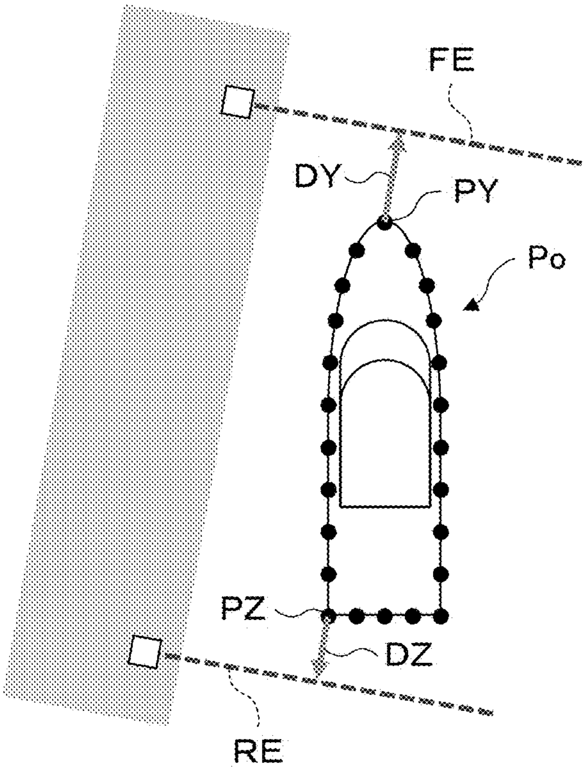
FIG. 17D is a view showing a proximate portion PY to the front end FE, a shortest distance DY to the front end FE, a proximate portion PZ to the rear end RE, and a shortest distance DZ to the rear end RE.

Further, using the same method as the above Step 1 to Step 3, the controller 13 calculates the proximate portion PY to the front end FE among the contour points Po, the shortest distance from the contour point Po to the front end FE, the proximate portion PZ to the rear end RE among the contour point Po, and the shortest distance DZ from the contour point Po to the rear end RE, respectively. FIG. 17D is a view showing the proximate portion PY to the front end FE, the shortest distance DY to the front end FE, the proximate portion PZ to the rear end RE, and the shortest distance DZ to the rear end RE.

Figure 17E:
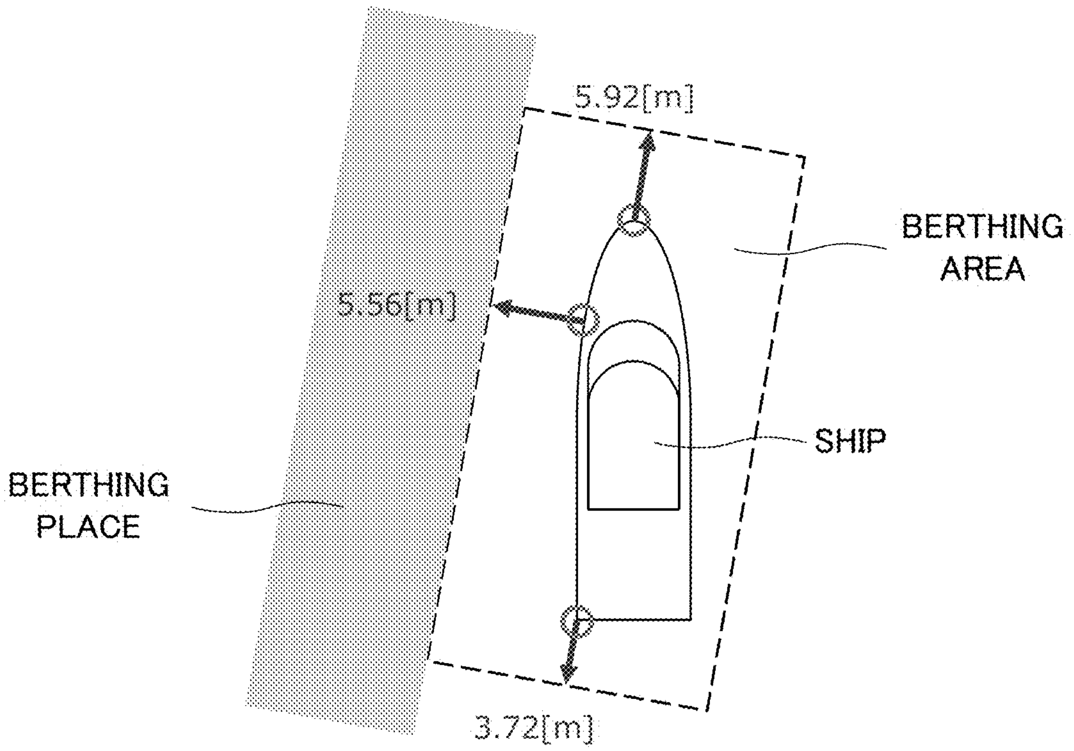
FIG. 17E is a diagram showing a display example of the berthing support information.

Then, the controller 13 generates an information display screen including information relating to the proximate portions PX, PY and PZ, and information relating to the shortest distances DX, DY and DZ, and displays the generated information display screen on the monitor 14. According to such a process, for example, an information display screen including the berthing support information as shown in FIG. 17E can be displayed on the monitor 14. FIG. 17E is a diagram showing a display example of the berthing support information.

According to the display example shown in FIG. 17E, it is possible to grasp the positions corresponding to the proximate portions PX, PY and PZ in the target ship. Also, according to the display example shown in FIG. 17E, it is possible to grasp that the shortest distance DX is 5.56 meters, the shortest distance DY is 5.92 meters, and the shortest distance DZ is 3.72 meters. Therefore, according to the modification, since it is possible to grasp the portions of the ship that are closest to the quay or the front and rear ends of the berthing area and the distances thereto, it will be useful for safer and smoother ship operation support.

Further, when an obstacle such as another ship is located in the vicinity of the berthing area, the controller 13 determines the proximity portions which are the positions of the hull closest to the obstacle, and the shortest distances from the proximate portions to the obstacle, by the following Step 4 to Step 5. Incidentally, when performing the processing according to the following Step 4 to Step 5, the controller 13 may treat an object other than the quay of the berthing place as an obstacle, for example.

(Step 4) Calculate the distance from the contour point Po to each data point representing the obstacle, and extract the minimum value of the distances from the contour points Po to one data point representing the obstacle.

(Step 5) Determine the smallest one of the extracted minimum values to be the shortest distance to the obstacle, and determines the contour point Po for which the shortest distance is calculated to be the proximate portion to the obstacle.

Figure 18A:
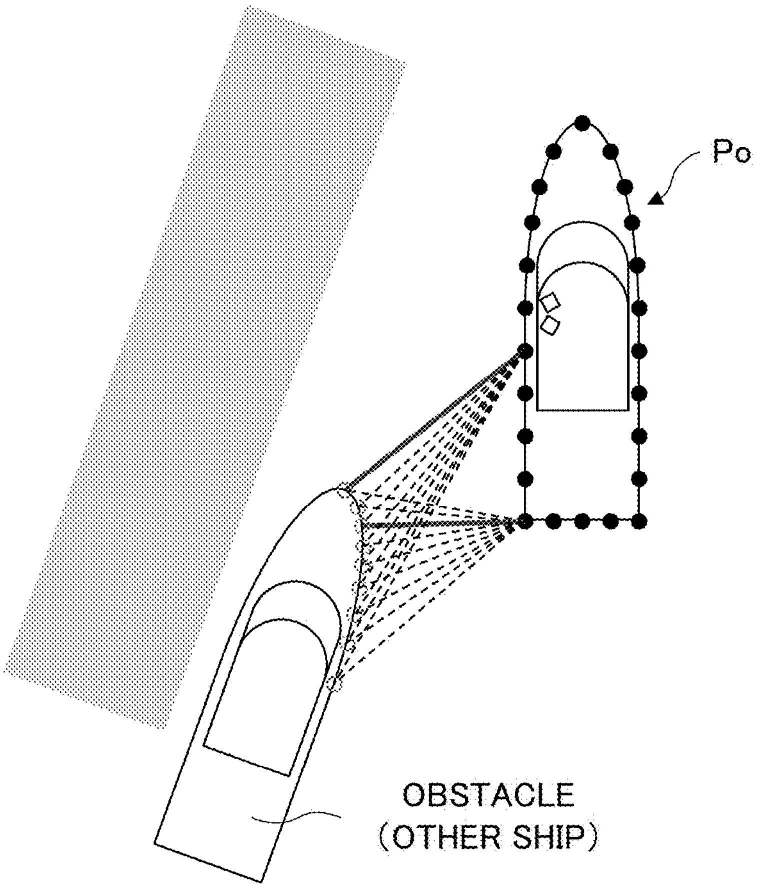
FIG. 18A is a diagram showing an outline of a process for extracting a minimum value of a distance from a contour point Po to data points representing an obstacle.

FIG. 18A is a diagram showing an outline of a process for extracting the minimum value of the distance from a contour point Po to a data point representing an obstacle. In the FIG. 18A, from among the 24 contour points Po, the distances from the first contour point to the data points representing the other ship and the distances from the second contour point to the data points representing the other ship are indicated by broken lines. Further, in the FIG. 18A, from among the 24 contour points Po, the minimum value of the distance from the first contour point to the data points representing the other ship and the minimum value of the distance from the second contour point to the data points representing the other ship are indicated by the solid lines.

Figure 18B:
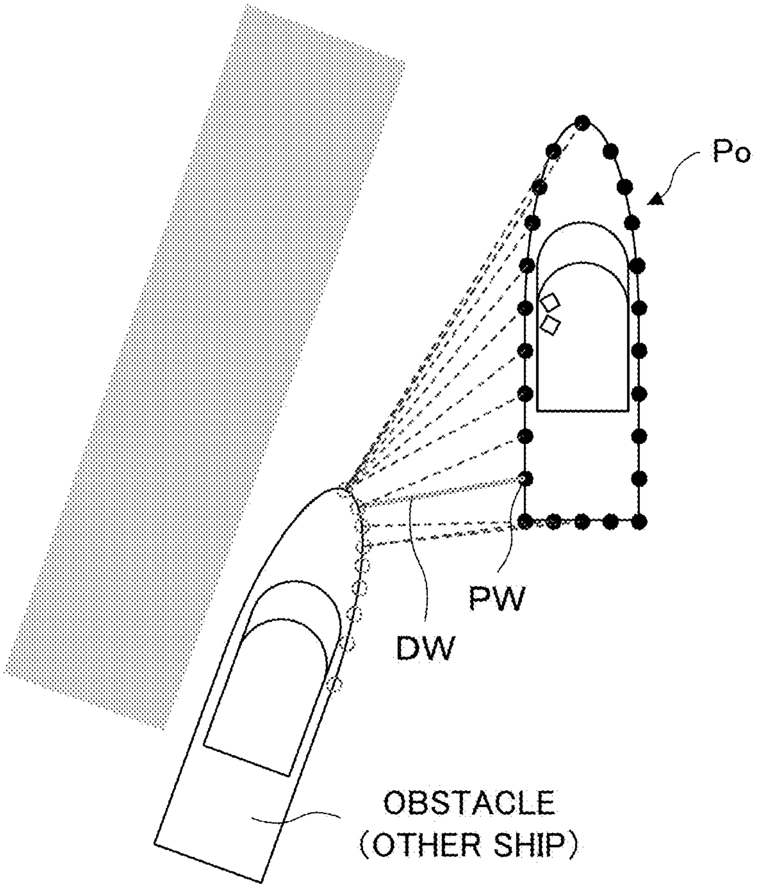
FIG. 18B is a diagram showing an outline of a process for determining the proximate portion to the obstacle and the shortest distance to the obstacle.

FIG. 18B is a diagram showing an outline of a process for determining the proximate portion to the obstacle and the shortest distance to the obstacle. According to the process shown in FIG. 18B, the shortest distance DW to the obstacle is determined by extracting the smallest one of the shortest distances from the 24 contour points Po to the obstacle, and the contour point at which the shortest distance DW is calculated is determined to be the proximate portion corresponding to the position of the hull closest to the obstacle.

Figure 18C:
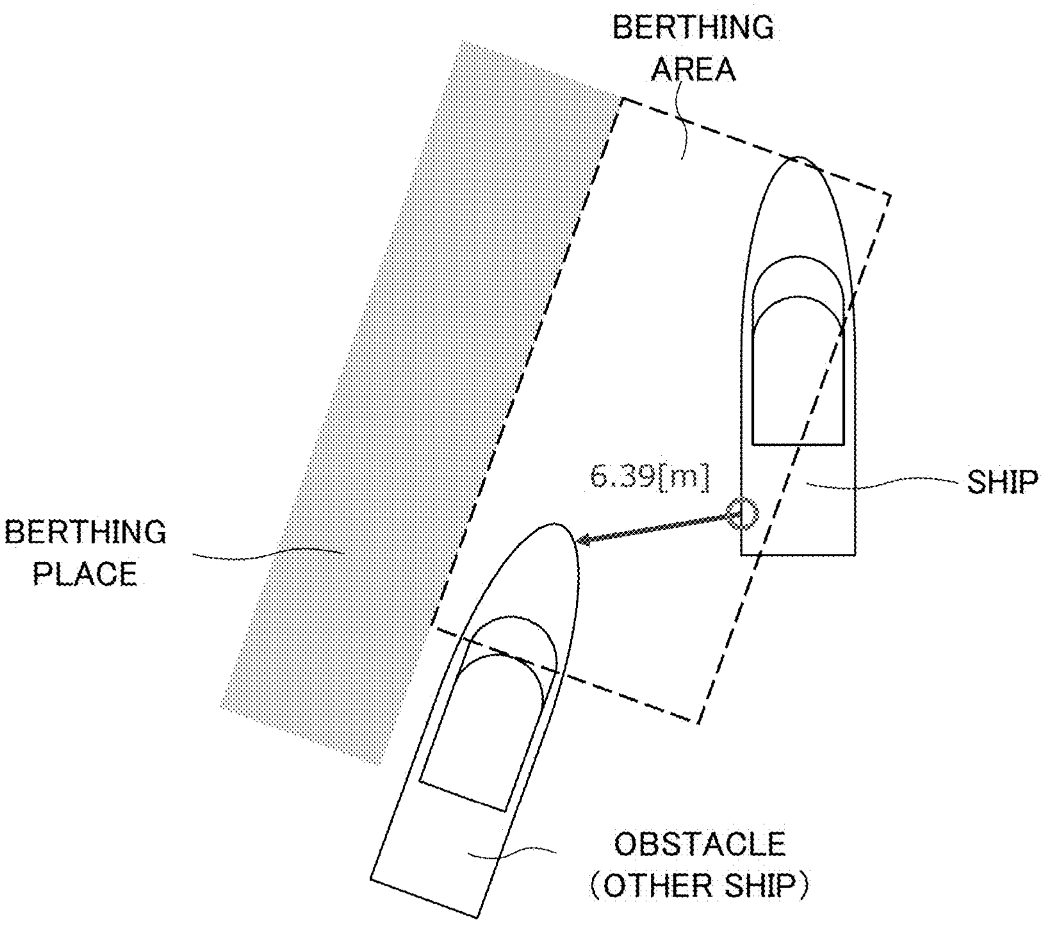
FIG. 18C is a diagram showing a display example of the berthing support information.

Then, the controller 13 generates an information display screen including information relating to the proximate portion PW and information relating to the shortest distance DW, and displays the generated information display screen on the monitor 14. According to such a process, for example, an information display screen including the berthing support information as shown in FIG. 18C can be displayed on the monitor 14. FIG. 18C is a diagram showing a display example of the berthing support information.

According to the display example shown in FIG. 18C, it is possible to grasp the position corresponding to the proximate portion PW in the target ship. In addition, according to the displays shown in FIG. 18C, it is possible to grasp that the shortest distance DW is 6.39 meters. Therefore, according to the modification, when an obstacle such as another ship exists near the berthing area, the portion of the ship closest to the obstacle and the distance to the obstacle can be grasped, so that it is useful for safer and smoother ship handling support.

Figure 19:
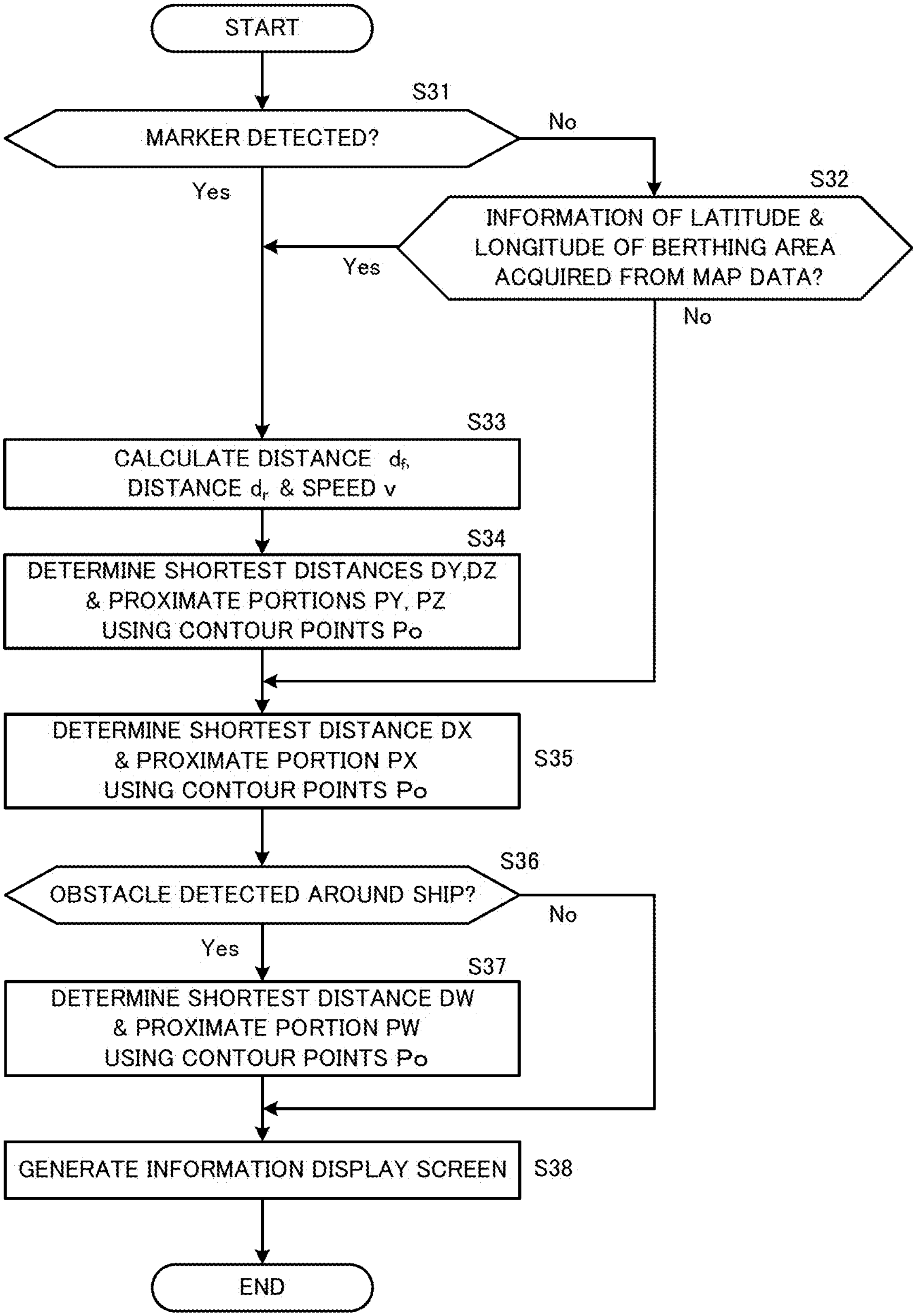
FIG. 19 is a flowchart illustrating an example of processing relating to generation of an information display screen in the modification.

Next, the processing flow related to the above-described processing will be described. Incidentally, the respective processes included in the processing flow to be described below may be executed in step S17 of FIG. 16, for example. FIG. 19 is a flowchart illustrating an example of processing relating to generation of an information display screen in the modification.

First, based on the point cloud data output from the lidar 3, the controller 13 determines whether or not at least one marker installed in the berthing place can be detected (step S31).

When the controller 13 determines that the marker installed in the berthing place can be detected (step S31: Yes), the controller 13 acquires the coordinate position of the marker and the information relating to the berthing area in the berthing place, and performs the process of step S33 described below. On the other hand, when the controller 13 determines that the marker installed in the berthing place cannot be detected (step S31: No), the controller 13 determines whether or not information relating to the latitude and longitude of the berthing area corresponding to the berthing place can be acquired from the map data by referring to the map data stored in the memory 12 (step S32).

When the controller 13 determines that the information related to the latitude and longitude of the berthing area area can be acquired from the map data (step S32: Yes), the controller 13 acquires the information and then performs a process of step S33 described later. On the other hand, when the controller 13 determines that the information relating to the latitude and longitude of the berthing area cannot be acquired from the map data (step S32: No), the controller 13 performs process of step S35 described below.

The controller 13 performs a process for calculating the distance $d_f$, the distance $d_r$, and the speed v based on the processing results of step S31 or step S32 (step S33).

Subsequently, the controller 13 performs a process for determining the shortest distances DY and DZ and the proximate portions PY and PZ using the contour points Po.

Subsequently, the controller 13 performs a process for determining the shortest distance DX and the proximate portion PX using the contour points Po (step S35).

Subsequently, the controller 13 determines whether or not an obstacle around the target ship is detected based on the point cloud data output from the lidar 3 (step S36).

When the controller 13 determines that an obstacle around the target ship is detected (step S36: Yes), the controller 13 performs a process for determining the shortest distance DW and the proximate portion PW using the contour points Po, and then performs a process of step S38 described below. On the other hand, when the controller 13 determines that no obstacle is detected around the target ship (step S36: No), the controller 13 skips the process of step S37 and perform the process of step S38 described below.

The controller 13 generates an information display screen including information relating to at least one parameter obtained by the processes of steps S31 to S37 (step S38), and displays the generated information display screen on the monitor 14.

According to this modification, the necessity of displaying the respective information on the information display screen generated in step S38 may be selected according to an instruction of the user.

According to the process described above, an acquisition means acquires measurement data generated by a measuring device provided on a ship. Further, according to the process described above, a marker position acquisition means acquires positions of the two markers serving as a mark relating to the berthing area, where the ship should be positioned when the ship is berthing to the berthing place, based on the measurement data. Further, according to the process described above, a display processing means performs a process for displaying information relating to the relative positional relationship between the berthing area identified based on the position of the two markers and the ship on the display device.

As described above, according to the present embodiment, information relating to the relative positional relationship between the berthing area and the target ship can be displayed on the monitor 14 in the manner as shown in the above display examples. Therefore, according to the present embodiment, it is possible to accurately grasp the positional relationship between the berthing area and the ship.

The controller 13 can calculate the berthing parameters even when no marker is provided on the berthing place. Therefore, according to the present embodiment, the controller 13 can display the distance $d_q$ in the first display method, the speed $v_q$ in the second display method, and the angle $\Psi_q$ in the third display method on the monitor 14 even when no marker is provided on the berthing place. Further, when the latitude and longitude of the four vertices constituting the berthing area are registered in the map data in advance, and the receiver of GNSS signal is provided on the target ship, the controller 13 can display the same information as the information shown in the respective display examples in the first to fifth display methods on the monitor 14 even if no marker is provided on the berthing area.

In the present embodiment described above, the program may be stored using various types of non-temporary computer readable media (non-transitory computer readable medium) and supplied to a controller that is a computer, etc. Non-transitory computer readable media include various types of entity storage media (tangible storage medium). Examples of non-transitory computer-readable media include magnetic storage media (e.g., flexible disks, magnetic tapes, hard disk drives), magneto-optical storage media (e.g., magneto-optical disks), CD-ROM (Read Only Memory), CD-R, CD-R/W, solid-state memories (e.g., mask ROM, PROM (Programmable ROM), EPROM (Erasable PROM) and flash ROM, RAM (Random Access Memory.

While the present invention has been described with reference to the embodiments, the present invention is not limited to the above embodiments. Various modifications that can be understood by a person skilled in the art within the scope of the present invention can be made to the configuration and details of the present invention. That is, the Present invention includes, of course, various modifications and modifications that may be made by a person skilled in the art according to the entire disclosure and technical concepts including the scope of claims. In addition, each disclosure of the above-mentioned patent documents cited shall be incorporated by reference in this document.

DESCRIPTION OF REFERENCE NUMBERS

1 Information processing device
2 Sensor group
3 Lidar

The invention claimed is:

1. An information processing device comprising:

a memory configured to store instructions; and a processor configured to execute the instructions to:

acquire measurement data generated by a measurement device provided on a ship;

perform a process for displaying information relating to a relative positional relationship between the ship and a berthing area on a display device based on the measurement data, the berthing area being an area where the ship should be positioned when the ship is berthed to a berthing place;

generate a straight line along a side surface of a quay of the berthing place using measured points of an edge portion of the berthing place acquired from the measurement data; and change a display mode of the information displayed on the display device according to a distance calculated based on the straight line.

2. The information processing device according to claim 1, wherein the processor is further configured to execute the instructions to acquire a position of at least one marker serving as a mark for the berthing area, based on the measurement data, wherein the processor performs the process for displaying information relating to the relative positional relationship between the ship and the berthing area determined based on the at least one marker on the display device.

3. The information processing device according to claim 2, wherein the processor performs a process for displaying information relating to a distance from a bow of the ship to a front end of the berthing area, and information relating to a distance from a stern of the ship to a rear end of the berthing area on the display device.

4. The information processing device according to claim 3, wherein the processor further performs a process for displaying information relating to a distance from the ship to the side surface of the quay of the berthing place on the display device.

5. The information processing device according to claim 2, wherein the processor changes the display mode for displaying information relating to speed at which the ship moves in a quay direction of the berthing area and information relating to speed at which the ship moves in a front and rear direction of the berthing area on the display device, according to a speed corresponding to time variation of the distance.

6. The information processing device according to claim 5, wherein the processor further performs a process for displaying information relating to movement speed of the ship on the display device, the movement speed being calculated by combining the speed at which the ship moves in the quay direction of the berthing area and the speed at which the ship moves in the front and rear direction of the berthing area.

7. The information processing device according to claim 2, wherein the processor changes the display mode for displaying information relating to an angle that is calculated based on the straight line and indicates a direction of the ship with respect to the side surface of the quay at the berthing place on the display device.

8. The information processing device according to claim 2, wherein the processor performs a process for displaying information relating to a predicted position and a predicted attitude of the ship from a present time to a time when a predetermined time has elapsed, on the display device, as information relating to the ship moving in the berthing area.

9. The information processing device according to claim 2, wherein the processor performs a process for displaying information relating to a route for guiding the ship from a current position to a predetermined berthing position within the berthing area, on the display device, as information relating to the ship moving within or around the berthing area.

10. The information processing device according to claim 1, wherein the processor is further configured to execute the instructions to:

extract a minimum value of lengths of perpendiculars formed from contour points of the ship to the straight line along the side surface of the quay of the berthing place, and calculate a shortest distance from a hull of the ship to the quay of the berthing place; and determine the contour point for which the shortest distance is calculated, to be a proximate portion corresponding to a portion of the hull of the ship closest to the quay of the berthing place, wherein the processor performs a process for displaying information relating to the shortest distance and the proximate portion on the display device.

11. The information processing device according to claim 1, wherein the processor is further configured to execute the instructions to:

extract a minimum value of distances from contour points of the ship to the measurement data representing an object other than the quay of the berthing place, and calculate a shortest distance from a hull of the ship to the object; and determine the contour point for which the shortest distance is calculated, as a proximate portion corresponding to a portion of the hull of the ship closest to the object, wherein the processor performs a process for displaying information relating to the shortest distance and the proximate portion on the display device.

12. A control method performed by a computer, comprising:

acquiring measurement data generated by a measurement device provided on a ship;

performing a process for displaying information relating to a relative positional relationship between the ship and a berthing area on a display device based on the measurement data, the berthing area being an area where the ship should be positioned when the ship is berthed to a berthing place;

generating a straight line along a side surface of a quay of the berthing place using measured points of an edge portion of the berthing place acquired from the measurement data; and changing a display mode of the information displayed on the display device according to a distance calculated based on the straight line.

13. A non-transitory computer-readable storage medium storing a program, the program causing a computer to execute processing of:

acquiring measurement data generated by a measurement device provided on a ship;

performing a process for displaying information relating to a relative positional relationship between the ship and a berthing area on a display device based on the measurement data, the berthing area being an area where the ship should be positioned when the ship is berthed to a berthing place;

generating a straight line along a side surface of a quay of the berthing place using measured points of an edge portion of the berthing place acquired from the measurement data; and changing a display mode of the information displayed on the display device according to a distance calculated based on the straight line.

* * * * *